United States Patent
McCune et al.

(10) Patent No.: US 9,458,311 B2
(45) Date of Patent: Oct. 4, 2016

(54) ETHYLENE BASED POLYMERS AND ARTICLES MADE THEREFROM

(71) Applicant: ExxonMobil Chemical Patents Inc., Baytown, TX (US)

(72) Inventors: Mallarie D. McCune, Houston, TX (US); Jianya Cheng, Kingwood, TX (US); Steven A. Best, The Woodlands, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/329,392

(22) Filed: Jul. 11, 2014

(65) Prior Publication Data

US 2015/0065656 A1 Mar. 5, 2015

Related U.S. Application Data

(60) Provisional application No. 61/870,398, filed on Aug. 27, 2013.

(51) Int. Cl.
*C08L 23/08* (2006.01)

(52) U.S. Cl.
CPC ........ *C08L 23/0815* (2013.01); *C08L 2203/16* (2013.01)

(58) Field of Classification Search
CPC .... C08L 23/04; C08L 23/08; C08L 23/0807; C08L 23/10; C08L 23/14; C08L 2205/02; C08L 2205/03; C08F 10/04; C08F 10/06
See application file for complete search history.

(56) References Cited

U.S. PATENT DOCUMENTS

2003/0216518 A1* 11/2003 Tau ..................... C08L 23/0815
525/191

FOREIGN PATENT DOCUMENTS

| EP | 0 757 069 A | 2/1977 |
| WO | WO 2007/003523 | 1/2007 |
| WO | WO-2014042898 A2 * | 3/2014 |

* cited by examiner

*Primary Examiner* — Irina S Zemel
*Assistant Examiner* — Jeffrey Lenihan

(57) ABSTRACT

Polymer compositions that include an ethylene-based polymer and a broad molecular weight distribution propylene-based polymer having a melt strength of 20.0 cN to 200.0 cN; and optionally, a propylene-based elastomer are described. The invention also includes articles, such as films, produced from such compositions and methods of making such compositions and methods of improving melt strength.

21 Claims, 6 Drawing Sheets

ETHYLENE BASED POLYMERS AND ARTICLES MADE THEREFROM

PRIORITY

This application claims the benefit of Ser. No. 61/870,398, filed Aug. 27, 2013, the disclosure of which is incorporated herein by reference in its entirety.

FIELD OF THE INVENTION

The present invention is directed to compositions that include an ethylene-based polymer, a broad molecular weight distribution propylene-based polymer, and optionally propylene-based elastomers. Articles made therefrom and methods of making articles, particularly films, especially thick films and membranes, are also described.

BACKGROUND OF THE INVENTION

Both low density polyethylenes (LDPEs) made using a conventional high-pressure process and linear low density polyethylenes (LLDPEs) produced using a Ziegler-Natta catalyst in a gas phase process, and blends and articles made therefrom, are generally known in the art. While such polyethylenes are sometimes preferred because they provide relatively low-cost solutions to a number of needs, their properties render them less desirable than other polyethylenes for a number of applications. For example, LLDPE and LDPE films cannot be produced in high-stalk bubble blown film lines due to a lack of melt strength, and therefore cannot be produced with balanced machine direction (MD)—transverse direction (TD) shrink properties. Also, gauge films cannot be produced with LLDPE in a low-stalk process with a reasonable line speed due to a lack of melt strength.

Certain metallocene-catalyzed polyethylenes are able to be used in a high-stalk process and in producing thick gauge films in a low-stalk process because of the melt strength they exhibit, and are also able to contribute desired toughness and optical properties to the films that are produced therewith. These metallocene-catalyzed polyethylenes are able to produce film with high TD shrinkability even at thin gauge, good toughness (particularly as measured by, e.g., MD tear, dart and puncture resistance) and good optical properties (e.g., low haze and high gloss).

However, metallocene-catalyzed polyethylene sometimes require a higher melt strength, and attempts have been made to blend it with polypropylene with that goal in mind. As a result, it has been observed that while polypropylene blended into metallocene-catalyzed polyethylene may provide additional melt strength, there is often poor miscibility between the two resins which may cause undesirable mechanical and optical properties. It has also been observed that there is an additional need for polyethylene-polypropylene blends that exhibit increased elasticity and processability.

Background references include WO 2007/003523 and EP 0 757 069 A.

SUMMARY OF THE INVENTION

In one aspect, there is provided a polymer composition comprising: (a) an ethylene-based polymer; (b) a propylene-based polymer having a MWD greater than 5.0 and a melt strength of 20.0 cN to 200.0 cN; and (c) optionally, a propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g.

In another aspect, embodiments herein provide a method of improving the melt strength of an ethylene-based polymer comprising: combining the ethylene-based polymer with 12.5 to 30.0 wt. % of a propylene-based polymer having a MWD greater than 5.0, particularly 5.0 to 20.0, or about 6.0 to 15.0 and a melt strength of 20.0 cN to 200.0 cN.

Yet another aspect provides a method of making a polymer composition comprising: combining at least the following: (a) an ethylene-based polymer; (b) a propylene-based polymer having a MWD greater than 5.0 and a melt strength of 20.0 cN to 200.0 cN, particularly about 50 cN to 200 cN; and (c) optionally, a propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g.

Particular embodiments provide a composition formed from at least the following: (a) 65.0 to 90.0 wt. % of an ethylene-based polymer comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a CDBI≥70.0; a melt index, $I_{2.16}$, of about 0.05 to about 0.50 g/10 min.; a density of from about 0.930 to about 0.950 g/cm$^3$; and a MWD of about 2.5 to about 5.5; (b) 10.0 to 35.0 wt. % of a propylene-based polymer having a MWD greater than 5.0 and a melt strength of 20.0 cN to 200.0 cN; and (c) 0 to about 25.0 wt. % of one or more propylene-based elastomers comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g.

Still other particular embodiments provide compositions formed from at least the following: (a) 65.0 to 90.0 wt. % of an ethylene-based polymer comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a local maximum loss angle at a complex modulus, $G^*$, of $2.50 \times 10^4$ to $1.00 \times 10^6$ Pa, preferably $2.50 \times 10^4$ to $1.00 \times 10^5$ Pa and a local minimum loss angle at a complex modulus, $G^*$, of $1.00 \times 10^4$ to $3.00 \times 10^4$ Pa, preferably $1.25 \times 10^4$ to $2.00 \times 10^4$ Pa; (b) 10.0 to 35.0 wt. % of a propylene-based polymer having a MWD greater than 5.0 and a melt strength of 20.0 cN to 200.0 cN; and (c) 0 to about 25.0 wt. % of one or more propylene-based elastomers comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g.

Articles of manufacture, particularly a film or membrane, formed from any of the above-described compositions or methods are envisioned.

DESCRIPTION OF EMBODIMENTS OF THE INVENTION

Figure 1:
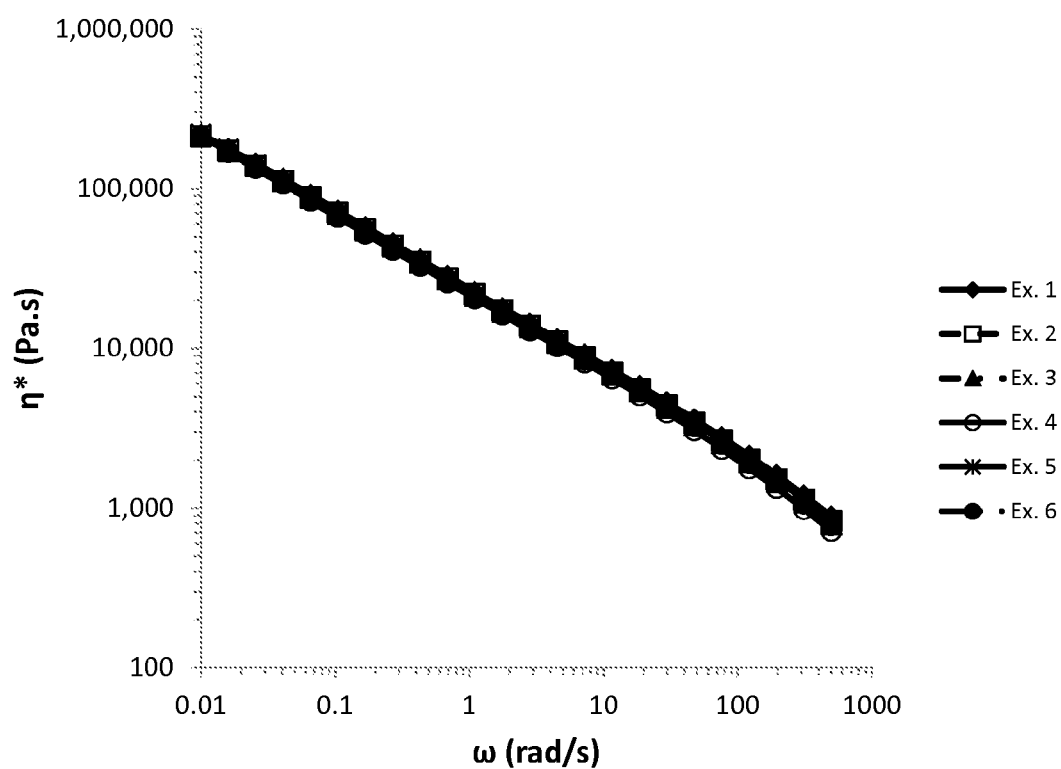
FIG. 1 illustrates dynamic oscillatory sheer behavior of particular exemplary compositions described herein.
Figure 2:
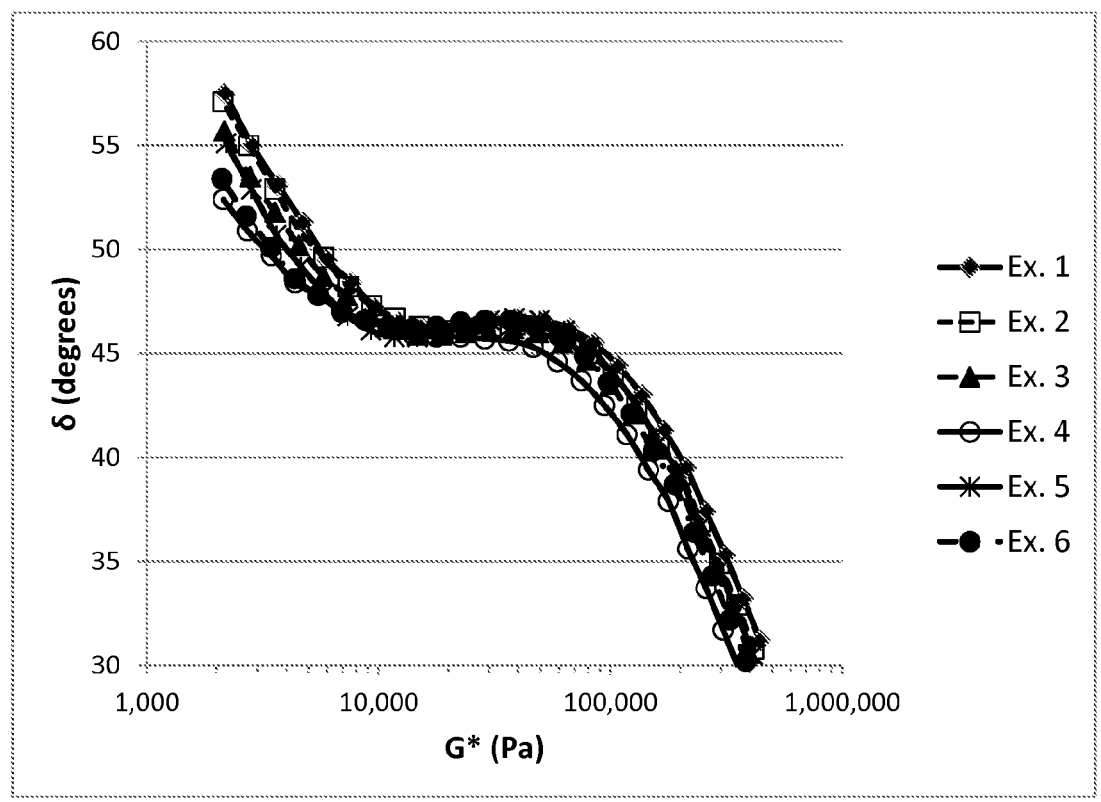
FIG. 2 illustrates Van Gurp-Palmen behavior of particular exemplary compositions described herein.
Figure 3:
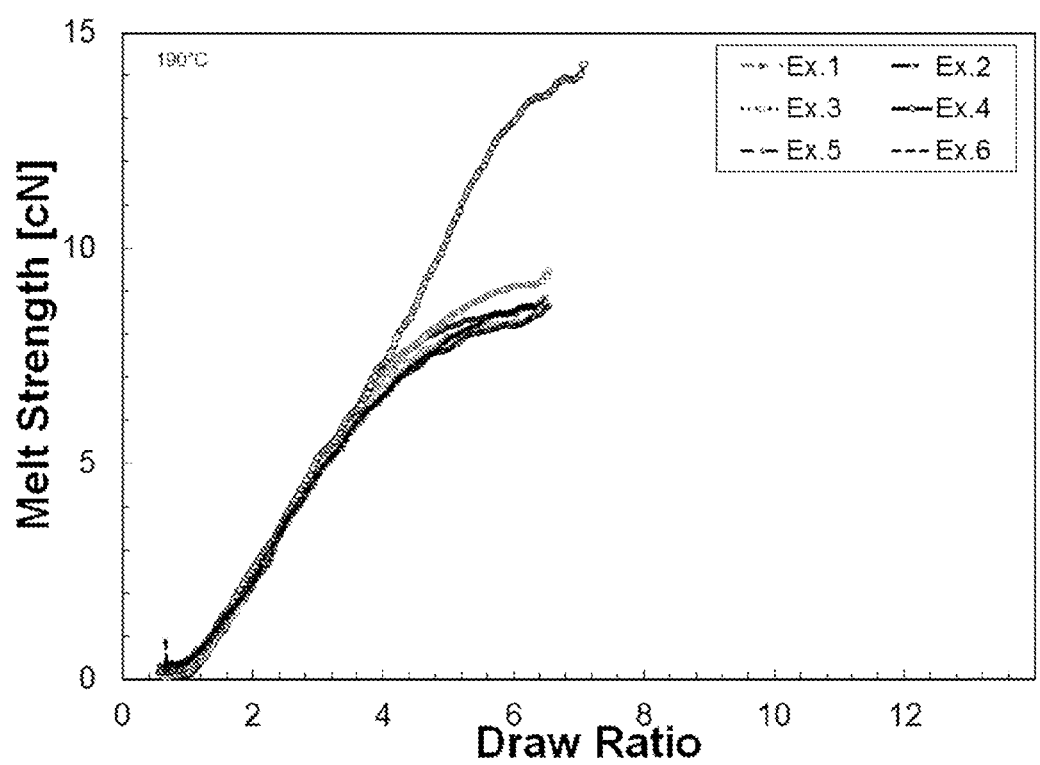
FIG. 3 illustrates melt strength behavior of particular exemplary compositions described herein.
Figure 4:
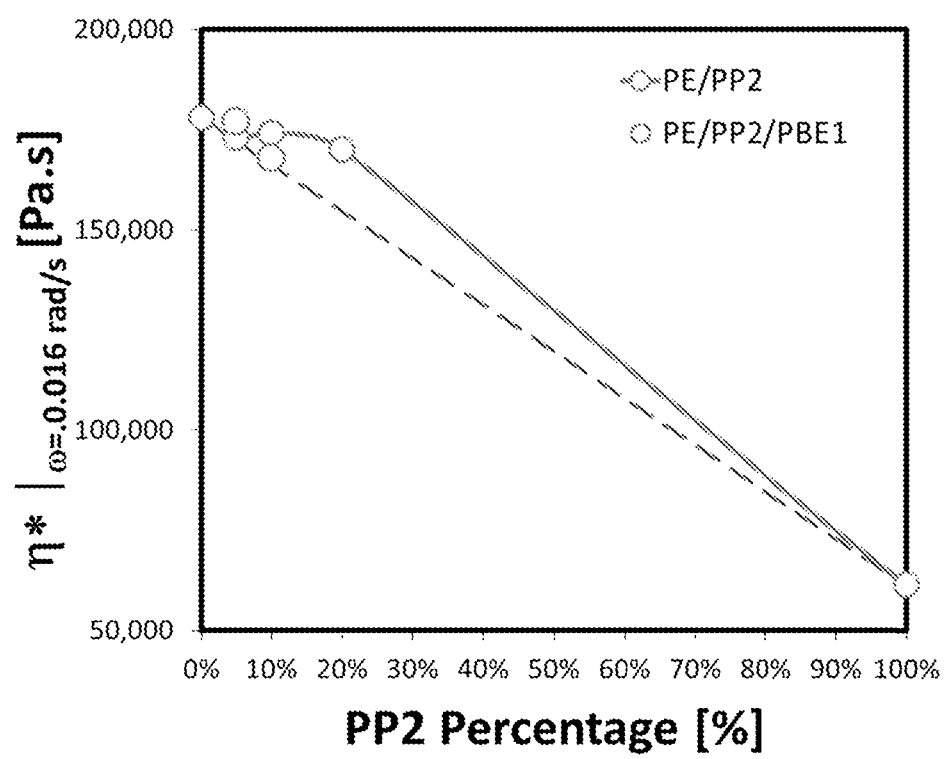
FIG. 4 illustrates the compatibility of particular exemplary compositions described herein.
Figure 5:
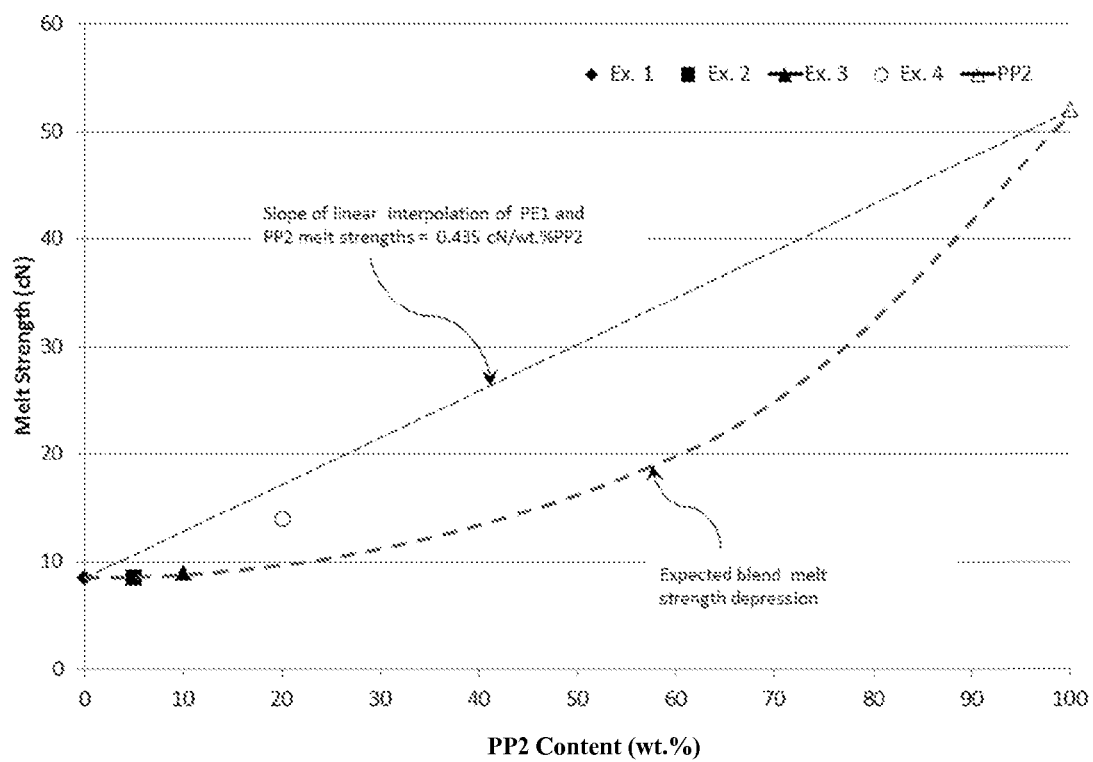
FIG. 5 illustrates the melt strength of particular exemplary compositions described herein.
Figure 6:
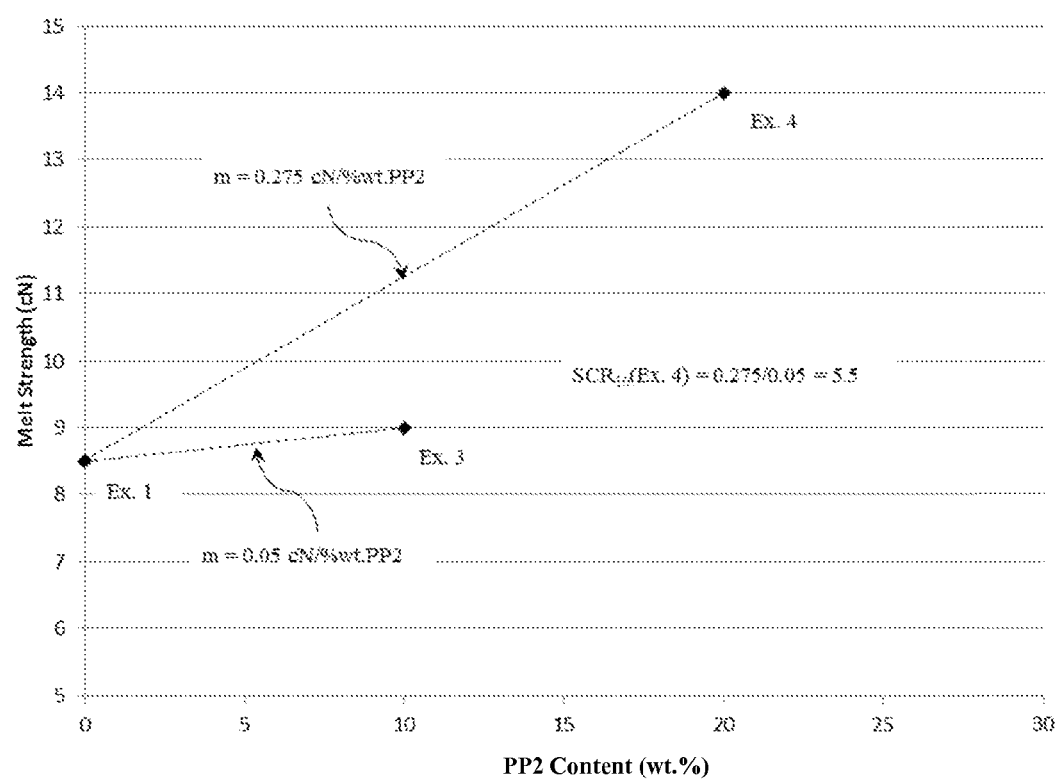
FIG. 6 illustrates the melt strength and slope change ratio of particular exemplary compositions described herein.

Embodiments of the invention provide a polymer composition having an unexpected combination of properties, particularly when formed into articles such as films, especially thick films and membranes. Also unexpected, it has been found that at particular concentrations the ethylene-polymers described herein are compatible with the broad molecular weight propylene-based polymers described herein, thereby preferably allowing the melt strength of the ethylene-based polymer to be enhanced by the presence of the propylene-based polymer. In particular embodiments, the rheological and/or other properties of the ethylene-based polymer are substantially retained in the blend. Where increased compatibility or elasticity may be desired, an optional propylene-based elastomer may be included.

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$ wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt. % to 55 wt. %, it is understood that the mer unit in the copolymer is derived from ethylene in the polymerization reaction and said derived units are present at 35 wt. % to 55 wt. %, based upon the weight of the copolymer.

For purposes herein a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An "ethylene-based polymer" comprising at least 50 mol % of polymer units derived from ethylene, a "propylene-based polymer" is a polymer or copolymer comprising at least 50 mol % of polymer units derived from propylene, and so on.

For the purposes of this disclosure, the term "α-olefin" includes $C_2$ to $C_{22}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

Blend Compositions

Compositions described herein typically include at least one ethylene-based polymer and at least one propylene-based polymer. Some embodiments, particularly where improved elasticity is desired, may optionally include a propylene-based elastomer.

Typically, the composition includes about 50.0 to about 90.0 wt. % of one or more ethylene-based polymers described in further detail below, particularly 70.0 to 99.0 wt. %, 85.0 to 99.0 wt. %, or 90.0 to 98.0 wt. %. The upper limit on the amount of ethylene-based polymers in the composition may be 99.5 wt. %, 99.0 wt. %, 98.5 wt. %, 98.0 wt. %, 97.5 wt. %, 97.0 wt. %, 96.5 wt. %, 96.0 wt. %, 95.0 wt. %, 92.5 wt. %, 90.0 wt. %, 85.0 wt. %, 80.0 wt. %, 75.0 wt. %, 70.0 wt. %, 65.0 wt. %, 60.0 wt. %, 55.0 wt. %, or 50.0 wt. %. The lower limit on the amount of ethylene-based polymer in such compositions may be 50.0 wt. %, 55.0 wt. %, 60.0 wt. %, 65.0 wt. %, 70.0 wt. %, 75.0 wt. %, 80.0 wt. %, 85.0 wt. %, 90.0 wt. %, 92.5 wt. %, 95.0 wt. %, 96.0 wt. %, 96.5 wt. %, 97.0 wt. %, 97.5 wt. %, 98.0 wt. %, 98.5 wt. %, 99.0 wt. % or 99.5 wt. %. Compositions including any upper and lower limit of ethylene-based polymer are envisioned (e.g., 55.5 to 99.5 wt. %, 90.0 to 97.5 wt. %, 92.5 to 98.0 wt. %, 75.0 to 96.5 wt. %, etc.).

Embodiments generally include about 10.0 to about 50.0 wt. % of the one or more propylene-based polymers, particularly 10.0 to 45.0 wt. %, 10.0 to 40.0 wt. %, or 10.0 to 30.0 wt. %. In particular embodiments, the upper limit on the amount of propylene-based polymer may be 25.0 wt. %, 22.5 wt. %, 20.0 wt. %, 17.5 wt. %, 15.0 wt. %, 12.5 wt. %, or 10.0 wt. %. The lower limit on the amount of propylene-based polymer in some embodiments may be 10.0 wt. %, 12.5 wt. %, 15.0 wt. %, 17.5 wt. %, 20.0 wt. %, 22.5 wt. %, 25.0 wt. %, 30.0 wt. %, 35.0 wt. %, 40.0 wt. %, 45.0 wt. %, or 50.0 wt. %. Compositions including any upper and lower limit of propylene-based polymer are envisioned (e.g., 12.5 to 22.5 wt. %, 20.0 to 40.0 wt. %, 15.0 to 35.0 wt. %, 10.0 to 15.0 wt. %, 17.5 to 50.0 wt. %, etc.).

Embodiments optionally include greater than 0 (e.g., about 0.1) to about 25.0 wt. % of one or more propylene-based elastomers, particularly 5.0 to 20.0 wt. %, 5.0 to 15.0 wt. %, or 5.0 to 10.0 wt. %. In particular embodiments, the upper limit on the amount of propylene-based elastomer may be 25.0 wt. %, 22.5 wt. %, 20.0 wt. %, 17.5 wt. %, 15.0 wt. %, 12.5 wt. %, 10.0 wt. %, 7.5 wt. %, 5.0 wt. %, 4.0 wt.

%, 3.0 wt. %, 2.0 wt. %, 1.0 wt. %, 0.75 wt. %, 0.50 wt. %, 0.30 wt. %, 0.2 wt. %, or 0.1 wt. %. The lower limit on the amount of propylene-based elastomer in some embodiments may be 0.10 wt. %, 0.20 wt. %, 0.30 wt. %, 0.50 wt. %, 0.75 wt. %, 1.0 wt. %, 2.0 wt. %, 3.0 wt. %, 4.0 wt. %, 5.0 wt. %, 7.5 wt. %, 10.0 wt. %, 12.5 wt. %, 15.0 wt. %, 17.5 wt. %, 20.0 wt. %, 22.5 wt. %, or 25.0 wt. %. Compositions including any upper and lower limit of propylene-based elastomer are envisioned (e.g., 1.0 to 20.0 wt. %, 2.0 to 15.0 wt. %, 5.0 to 12.5 wt. %, 10.0 to 15.0 wt. %, or 10.0 to 20.0 wt. %, etc.).

The compositions may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder.

Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like. Accordingly, a polypropylene resin according to any of the embodiments disclosed herein, may further comprise greater than or equal to about 0.01 wt. % of one or more fillers; antioxidants; anti-cling agents; tackifiers; UV stabilizers; heat stabilizers; anti-blocking agents; release agents; anti-static agents; pigments; colorants; dyes; waxes; silica; talc; or a combination thereof.

Blend Properties

In some embodiments, the blend compositions may have a melt strength of 5.0 to 30.0 cN, particularly 8.0 to 25.0 cN, 9.0 to 20 cN, 10.0 to 18.0 cN, 10.0 to 17.0 cN, or 12.0 to 16.0 cN, determined using an extensional rheometer at 190° C.

Additionally, or alternatively, some blend compositions may have a complex modulus, $G_{50}^*$, about $2.50 \times 10^3$ Pa to about $1.0 \times 10^4$ Pa, preferably $3.00 \times 10^3$ Pa to about $1.0 \times 10^4$ Pa. The complex modulus can be measured at other loss angles. Some particular blends have complex modulus at a loss angle, δ, of 40°, $G_{40}^*$, $1.00 \times 10^5$ Pa to about $2.0 \times 10^5$ Pa, particularly $1.25 \times 10^5$ Pa to about $1.75 \times 10^5$ Pa, $1.40 \times 10^5$ Pa to about $1.60 \times 10^5$ Pa. Some ethylene based polymers have a G*=5,000 Pa at a loss angle, δ, of 40.0 to 55.0°, particularly 45.0 to 52.5°, or from 45.0° to 50.0°, e.g., $G_{45.0}^* = 5.00 \times 10^3$ Pa, $G_{47.0}^* = 5.00 \times 10^3$ Pa, or $G_{50.0}^* = 5.00 \times 10^3$ Pa.

While some blends may be characterized by a value of the complex modulus at a particular loss angle as described above, another way to describe some blends of the invention relates to features of the complex modulus values, G*, when considered over the range of loss angles from 30 to 90°. Some such blends have a local maximum loss angle at a G* value of $2.50 \times 10^4$ to $1.00 \times 10^5$ Pa, $2.50 \times 10^4$ to $8.0 \times 10^4$ Pa, or $2.5 \times 10^4$ to $6.0 \times 10^4$ Pa. In some embodiments, the blends have a local minimum loss angle at a complex modulus, G*, of $1.00 \times 10^4$ to $3.00 \times 10^4$ Pa, $1.25 \times 10^4$ to $2.50 \times 10^4$ Pa, or $1.40 \times 10^4$ to $2.25 \times 10^4$ Pa. In some embodiments, the local maximum loss angle is from 40.0 to 50.0°, preferably 40.0 to 45.0°, more preferably 42.5 to 45.0°. While not critical, some blends may have a local minimum loss angle of from 40.0 to 50.0°, preferably 40.0 to 45.0°, or more preferably 40.0 to 42.5°. In some such blends, there is both a local maximum and a local minimum as described.

Compositions, particularly those having <50.0 wt. %, particularly 10 to 40 wt. %, 10 to 30 wt. %, 10 to 25.0 wt. %, 10.0 to 25.0 wt. %, or 12.5 to 20.0 wt. % of the propylene based polymer, may have desirable Environmental Stress Crack Resistance (ESCR) performance. ESCR (bent strip) is determined in accordance with ASTM D1693, condition B, 10% IGEPAL™ (a nonylphenoxy poly(ethylenoxy)ethanol surfactant available from Rhone Polenc, Cranbury, N.J.). ESCR values may be from about $5.00 \times 10^2$ to $3.00 \times 10^3$, particularly $7.50 \times 10^2$ to $2.50 \times 10^3$ hours, or $1.00 \times 10^3$ to $2.0 \times 10^3$ hours.

Particular blends may be described as having an improved melt strength. The term "improved melt strength" as used herein means in one instance that the melt strength of the composition is greater than expected from the blend rule, where the expected value according to the blend rule is given by the fractional weighted average melt strength of the ethylene-based polymer and propylene-based polymer of the composition. Components other than the ethylene-based polymer and the propylene-based polymer, e.g., the optional propylene-based elastomer, should be ignored for this purpose. For example, a composition comprising 80 wt. % ethylene-based polymer, 10 wt. % propylene-based polymer, and 10 wt. % propylene-based elastomer, would be considered to comprise 80.0/90.0 wt. % ethylene-based polymer and 10/90.0 wt. % propylene-based elastomer. Graphically, the blend rule melt strength value is the melt strength value for the composition on the line connecting the individual melt strength values of the ethylene-based polymer and the propylene-based polymer. The value of the melt strength can be determined by first plotting the individual melt strength values of the ethylene-based polymer and the propylene-based polymer relative to the content of the propylene-based polymer. In such a plot, the melt strength value of the ethylene-based polymer would appear at a value of 0.0 wt. % and the melt strength value of the propylene-based polymer would appear at a value of 100.0 wt. %. The equation of the straight line connecting these two points can easily be determined. The blend rule value for melt strength of the composition in question is then calculated using the wt. % of propylene-based polymer in the blend in the straight line equation.

Because it is generally expected that blend property values will be less than that predicted by the linear relationship predicted by the blend rule, "increased melt strength" can also exist where the melt strength is less than that predicted by the simpler assumptions of the blend rule. But because the melt strength value can change rapidly over small changes in content of the propylene-based polymer in compositions containing relatively high concentration of the propylene-based elastomer, the relative values of the melt strengths can be of limited use in expressing melt strength improvement. Consequently, in such cases where the melt strength may be less than that predicted by the blend rule, the term "improved melt strength" as used herein means that the composition has greater than 10.0 wt. % propylene-based polymer and that the Slope Change Ratio (SCR) is greater than 1.0. $SCR_{10}$ can be defined as: the slope of the line connecting the melt strength of a composition with X wt. % propylene-based polymer to the melt strength of the ethylene-based polymer alone, that slope then being divided by the slope of the line connecting the melt strength of a composition having (X−10) wt. % propylene-based polymer to the melt strength of the ethylene-based polymer alone. Particular compositions have an $SCR_{10}$ greater than 2.0, particularly 2.0 to 20.0, 3.0 to 20.0, 4.0 to 20.0, 4.0 to 15.0, 4.0 to 10.0, 4.0 to 8.0, or 4.0 to 6.0 (based on the amounts of ethylene-based polymer and propylene-based polymer). In other words, where an ethylene-based polymer has a melt strength of 10 cN, for a composition having 80 wt. % of the ethylene-based polymer, 20 wt. % propylene based polymer (PP) and a melt strength of 40 cN, the slope of the 80/20 blend would be (40 cN−10 cN)/(20 wt. %−0 wt. %)=1.5 cN/wt. % PP. A composition comprising 90.0 wt. % of the ethylene-based polymer and 10.0 wt. % of the propylene-based polymer would be prepared and its melt strength measured. Assuming the melt strength of such a 90/10 composition is 15 cN, its slope would be (15 cN−10 cN)/(10 wt. %−0 wt. %)=0.5 cN/wt. % PP. The $SCR_{10}$ for the 80/20 composition would thus be 1.5/0.5=3.0. Some compositions, particularly where the melt strength improvement is quite pronounced, have an $SCR_5$ (defined as the slope of the line connecting the melt strength of a composition with X wt. % propylene-based polymer to the melt strength of the ethylene-based polymer alone divided by the slope of the line connecting the melt strength of a composition having (X−5) wt. % propylene-based polymer to the melt strength of the ethylene-based polymer alone) greater than 2.0, particularly 2.0 to 20.0, 3.0 to 20.0, 4.0 to 20.0, 4.0 to 15.0, 4.0 to 10.0, 4.0 to 8.0, or 4.0 to 6.0 (based on the amounts of ethylene-based polymer and propylene-based polymer).

While such melt strength improvement may be evident in or calculated from various blends, the melt strength improvement should be interpreted to apply to the entire range of ethylene-based polymer content. In other words, while the melt strength improvement may occur in a region between 20.0 and 30.0 wt. % propylene-based polymer, this should be interpreted to cover adding an amount of propylene-based polymer to an ethylene-based polymer alone to arrive at a composition having at least 20.0 wt. % propylene-based polymer. This should not be interpreted to mean that melt strength improvement occurs only upon adding propylene-based polymer to a composition that already has 20.0 wt. % of the propylene-based polymer therein.

Ethylene-Based Polymer

The ethylene-based polymer compositions herein refer to a polyethylene copolymer having about 99.0 to about 80.0 wt. %, 99.0 to 85.0 wt. %, 99.0 to 87.5 wt. %, 99.0 to 90.0 wt. %, 99.0 to 92.5 wt. %, 99.0 to 95.0 wt. %, or 99.0 to 97.0 wt. %, of polymer units derived from ethylene and about 1.0 to about 20.0 wt. %, 1.0 to 15.0 wt. %, 1.0 to 12.5 wt. %, 1.0 to 10.0 wt. %, 1.0 to 7.5 wt. %, 1.0 to 5.0 wt. %, or 1.0 to 3.0 wt. %, of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer may be linear or branched, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene being most preferred.

Typically, ethylene-based polymers have a CDBI of at least 70%, preferably ≥80.0%, preferably ≥85.0%, preferably ≥90.0%; e.g., 70.0 to 98%, 80.0 to 95.0%, or 85.0 to 90.0%.

Ethylene-based polymers of particular embodiments may be characterized as having long-chain branches. The number of carbon atoms on a long-chain branch ranges from a chain length of at least one carbon more than two carbons less than the total number of carbons in the comonomer, to several thousand. For example, a long-chain branch of an ethylene/hexene ethylene-based polymer is at least five (5) carbons in length (i.e., 6 carbons less 2 equals 4 carbons plus one equals a minimum branch length of five carbons for long-chain branches). Particular ethylene-based polymers have a 0.05 to 1.0, particularly 0.05 to 0.5, 0.1 to 0.4, or 0.2 to 0.3, long-chain branches per 1000 carbon atoms. Ethylene-based polymers having levels of long-chain branching greater than 1.0 long-chain branch per 1000 carbon atoms may have some beneficial properties, e.g., improved processability, shear thinning, and/or delayed melt fracture, and/or improved melt strength. Long-chain branches typically represent the branches formed by reincorporation of vinyl-terminated macromers, not the branches formed by incorporation of the comonomers.

Typically, such polyethylenes have a $g_{vis}'$ of 0.85 to 0.98, particularly, 0.87 to 0.97, 0.89 to 0.97, 0.91 to 0.97, or 0.93 to 0.95.

Additionally or alternatively, some particularly suitable ethylene-based polymers have a complex modulus, $G_{60}^*$, <2.50×10³ Pa, preferably <2.00×10³ Pa. The complex modulus can be measured at other loss angles. Some particular ethylene-based polymers have complex modulus at a loss angle, δ, of 50°, $G_{50}^*$, <50.00×10³ Pa, preferably <25.00×10³ Pa, preferably <20.00×10³ Pa, preferably <10.00×10³ Pa, preferably <5.00×10³ Pa. Some ethylene based polymers have a G*=2,000 at a loss angle, δ, of ≤62.5°, particularly ≤60.0°, or from 60.0° to 62.5°, i.e., $G_{\le 62.5}^*$=2.00×10³, $G_{\le 60.0}^*$=2.00×10³, or $G_{60.0-62.5}^*$=2.00×10³.

While some polymers may be characterized by a value of the complex modulus at a particular loss angle as described above, another way to describe some ethylene-based polymers of the invention relates to features of the complex modulus values, G*, when considered over the range of loss angles from 30 to 90°. Such ethylene-based polymers may have a local maximum loss angle at a G* value of 2.50×10⁴ to 1.00×10⁶ Pa, preferably 2.50×10⁴ to 1.00×10⁵ Pa and a local minimum loss angle at a complex modulus, G*, of 1.00×10⁴ to 3.00×10⁴ Pa, preferably 1.25×10⁴ to 2.00×10⁴ Pa. In some such ethylene-based polymers, the local maximum loss angle is from 40.0 to 50.0°, preferably 40.0 to 45.0°, more preferably 42.5 to 45.0°. While not critical, some ethylene-based polymers may have a local minimum loss angle of from 40.0 to 50.0°, preferably 40.0 to 45.0°, more preferably 40.0 to 42.5°.

Some ethylene-based polymers also have a strain hardening ratio of 1.0 to 10.0 at 10 $sec^{-1}$. The upper limit on the range of the strain hardening ratio may be 9.0, 8.0, 7.0, 6.0, 5.0, 4.0, 3.0, or 2.0. The lower limit on the range of the strain hardening ratio maybe 2.0, 3.0, 4.0, 5.0, 6.0, 7.0, 8.0, or 9.0. Any combination of lower and upper limits should be considered to be disclosed by the above limits on the strain hardening ratio, e.g., 2.0 to 9.0, 3.0 to 7.0, 1.0 to 4.0, or 3.0 to 4.0 etc.

The ethylene-based polymers preferably have a melt index, $I_{2.16}$, of about 0.05 to about 5.0 g/10 min., particularly 0.1 to 2.0 g/10 min., 0.1 to 1.0 g/10 min., 0.1 to 0.5 g/10 min., 0.1 to 0.35 g/10 min., or 0.10 to 0.30 g/10 min., more particularly 0.15 to 0.35 g/10 min. Some ethylene-based polymers also have a high-load melt index, $I_{21.6}$, of about 5.0 to about 20.0 g/10 min., particularly about 7.0 to about 15.0 g/10 min., more particularly about 9.0 to about 12.0 g/10 min. The melt index ratio ($I_{21.6}/I_{2.16}$) of the ethylene-based polymers has a lower limit of about 10.0 and an upper limit of about 400.0. The lower limit on the melt index ratio may be 15.0, 20.0, 30.0, 40.0, 50.0, 55.0, 60.0, 65.0, or 70.0. The upper limit on the melt index ratio may be 300.0, 200.0 100.0, 95.0, 90.0, 80.0, 75.0, or 70.0. Any combination of lower and upper limits should be considered to be disclosed by the above limits on the melt index ratio, e.g., 10.0 to 400.0, 40.0 to 200.0, 50.0 to 100.0, 60.0 to 80.0, etc.

Particular ethylene-based polymers have a density of from about 0.910 to 0.960 g/cm³, particularly 0.912 to about 0.955 g/cm³; 0.915 to about 0.955 g/cm³; 0.925 to about 0.955 g/cm³; more particularly 0.930 to 0.950 g/cm³, or 0.935 to 0.945 g/cm³.

Typically, although not necessarily, ethylene-based polymers have a molecular weight distribution (MWD) of about 2.5 to about 5.5, preferably 4.0 to 5.0.

Some ethylene-based polymers may also be characterized by an averaged 1% secant modulus (M) of from 10,000 to 60,000 psi (pounds per square inch), and a relation between M and the dart drop impact strength in g/mil (DIS) complying with formula (A):

$$DIS \geq 0.8 * [100 + e^{(11.71 - 0.000268M + 2.183 \times 10^{-9} M^2)}], \quad (A)$$

where "e" represents 2.7183, the base Napierian logarithm, M is the averaged modulus in psi, and DIS is the 26 inch dart impact strength. The DIS is preferably from about 120 to about 1000 g/mil, even more preferably, from about 150 to about 800 g/mil. The relationship of the Dart Impact Strength to the averaged 1% secant modulus is thought to be an indicator of long-chain branching in the ethylene-based polymer.

Some such mPEs are available from ExxonMobil Chemical Company under the tradename Enable™ mPE resins.

While any suitable polymerization method (including solution or slurry polymerization methods) may be used, the ethylene-based polymers of the present invention may be readily obtained via a continuous gas phase polymerization using supported catalyst comprising an activated molecularly discrete catalyst in the substantial absence of an aluminum alkyl based scavenger (e.g., triethylaluminum (TEAL), trimethylaluminum (TMAL), triisobutyl aluminum (TIBAL), tri-n-hexylaluminum (TNHAL), and the like). Non-limiting examples of metallocene catalysts and catalyst systems useful in practicing the present invention include those described in, U.S. Pat. Nos. 5,466,649, 6,476,171, 6,225,426, and 7,951,873; and in the references cited therein, all of which are fully incorporated herein by reference. Particularly useful catalyst systems include supported dimethylsilyl bis(tetrahydroindenyl) zirconium dichloride. Other suitable processes are described in, for example, U.S. Pat. Nos. 4,543,399, 4,588,790, 5,028,670, 5,317,036, 5,352,749, 5,405,922, 5,436,304, 5,453,471, 5,462,999, 5,616,661, and 5,668,228 all of which are fully incorporated herein by reference.

Still other processes for making ethylene-based polymers suitable for the compositions described herein include those described in U.S. Pat. Nos. 5,627,242, 5,665,818, and 5,677,375, and European published patent applications EP-A-0 794 200, EP-A-0 802 202 and EP-B-634 421, all of which are herein fully incorporated by reference. It may be beneficial in slurry or gas phase processes to operate in the substantial absence of or essentially free of any scavengers, as described in PCT Publication No. WO 96/08520, which is herein fully incorporated by reference. Additionally, the use of a process continuity aid, while not required, may be desirable in any of the foregoing processes. Such continuity aids are well known to persons of skill in the art and include, for example, metal stearates.

Propylene-Based Polymer

Propylene-based polymers suitable herein comprise at least 50 mol % polymer units derived from propylene and have a melt strength of at least 20 cN determined using an extensional rheometer at 190° C. Propylene-based polymer according to any of the embodiments disclosed herein may comprise at least 50 mol % polymer units derived from propylene and have a melt strength of at least 35.0 cN, or at least 40.0 cN, or at least 45.0 cN, or at least 50.0 cN, or at least 55.0 cN, or at least 60.0 cN, or at least 65.0 cN, or at least 70.0 cN, or at least 75.0 cN, or at least 80.0 cN, or from about 20.0 cN to 200.0 cN, about 50.0 cN to 200.0 cN, or from about 60.0 cN to 150.0 cN, or from about 70.0 cN to 200.0 cN, or any combination thereof, determined using an extensional rheometer at 190° C. as described herein. In other words, in some embodiments, the lower limit on the value of the melt strength may be e.g., 20.0 cN, 25.0 cN, 30.0 cN, 35.0 cN, 40.0 cN, 45.0 cN, 50.0 cN, 55.0 cN, 60.0 cN, 65.0 cN, 70.0 cN, 75.0 cN, 80.0 cN, 90.0 cN, 100.0 cN, 125.0 cN, 150.0 cN, 175.0 cN, or 200.0 cN and the upper limit on the value may be any of 35.0 cN, 40.0 cN, 45.0 cN, 50.0 cN, 55.0 cN, 60.0 cN, 65.0 cN, 70.0 cN, 75.0 cN, 80.0 cN, 90.0 cN, 100.0 cN, 125.0 cN, 150.0 cN, 175.0 cN, or 200.0 cN.

Propylene-based polymers useful herein may comprise at least 50.0 mol %, or at least 75 mol %, or at least 80 mol %, or at least 90 mol %, or at least 95 mol %, or at least 99 mol % polymer units derived from propylene. Some propylene-based polymers are polypropylene homopolymers. The lower limit on content of propylene-derived units in the propylene-based polymer may be 50.0 mol %, 60.0 mol %, 75.0 mol %, 80.0 mol %, 85.0 mol %, 90.0 mol %, 95.0 mol %, 98.0 mol %, 99.0 mol %, or 100.0 mol %. The upper limit in selected propylene-based polymers is 50.0 mol %, 60.0 mol %, 75.0 mol %, 80.0 mol %, 85.0 mol %, 90.0 mol %, 95.0 mol %, 98.0 mol %, 99.0 mol %, 99.9 mol %, or 100.0 mol %. Combinations of such lower and upper limits are envisioned, e.g., 50.0 to 99.0 mol %, 60.0 to 75.0 mol %, or 90.0 to 99.9 mol %, etc.

Propylene-based polymers useful herein comprise 0 to 50 mol %, 0 to 25.0 mol %, 0 to 20.0 mol %, 0 to 10.0 mol %, 0 to 5 mol % or 0 to 1.0 mol % polymer units derived from a comonomer. Particular propylene-based polymers comprise from about 0.1 to 10.0 mol % comonomer-derived units. In any embodiment, the comonomer may be an alpha olefin. In any embodiment, the comonomer may be selected from the group consisting of ethylene and $C_4$ to $C_{20}$ olefins.

Typically, propylene-based polymers useful herein have an MWD ($M_w/M_n$) of greater than about 5, or greater than or equal to about 6, or from about 6 to about 20, or from about 6 to about 15, or any combination thereof.

Propylene-based polymers useful herein may have a branching index (g') of at least about 0.95, or at least 0.99.

Propylene-based polymers useful herein may have a stiffness of greater than 2000 MPa, or greater than about 2100 MPa, or about 290 kpsi (2000 MPa) to about 360 kpsi (2500 MPa) determined according to ASTM D790A on nucleated samples with 0.1% sodium benzoate.

Propylene-based polymers useful herein may have a viscosity ratio of greater than or equal to about 35, or 40, or 45, or from about 35 to about 80 at an angular frequency ratio of 0.01 to 100 rad/s at a fixed strain of 10% at 190° C.

Propylene-based polymers useful herein may have a melt flow rate (MFR) from about 0.1 to 100 g/10 min., 0.2 to 50 g/10 min., or from about 0.3 to 10 g/10 min.

Propylene-based polymers useful herein may be an impact copolymer. For purposes herein, an impact copolymer refers to a resin comprising a homopolymer made in a bulk polymerization reactor followed by transferring the granules to the gas phase reactor and making ethylene-propylene rubber within the granules.

Some propylene-based polymers useful herein are non-functionalized polymers or resins. For purposes herein, a non-functionalized resin does not comprise grafted or otherwise post-reactor processed olefin polymers. By functionalized (or grafted) it is meant that various functional groups are incorporated, grafted, bonded to, and/or physically or chemically attached to the polymer backbone of the polymer being functionalized after formation of the base polymer. Examples of functionalized polymers include polymers in which functional groups are grafted onto the polymer backbone or pendent groups utilizing radical copolymerization of a functional group, referred to in the art as graft copolymerization. Examples of functional groups utilized to produce functionalized polymers include unsaturated carboxylic acids, esters of the unsaturated carboxylic acids, acid anhydrides, di-esters, salts, amides, imides, aromatic vinyl compounds, hydrolyzable unsaturated silane compounds, and unsaturated halogenated hydrocarbons. For purposes herein, functionalized polymers further include polymers grafted onto other polymers.

A functionalized polymer is considered to have indications of long chain branching (i.e., a g' less than 0.95), consistent with the cross-linking and intermolecular bonding associated with functionalized polymers.

For purposes herein, a functionalized polymer comprises greater than about 0.1 wt. % of a functional group and/or a g'<0.95, and/or is the product of a post reactor functionalization or grafting process. Accordingly, in any embodiment, the non-functionalized polymer may comprise less than 0.1 wt. % of a functional group and/or is not the product of a post-reactor functionalization process, and/or is not a post-reactor grafted polymer, and/or has a g'>0.95 determined as described herein.

In any embodiment the propylene-based polymer may be free of functionalized polypropylene or comprises <5 wt. % of functional groups selected from hydroxide, aryls, substituted aryls, halogens, alkoxys, carboxylates, esters, acrylates, and carboxyl, based upon the weight of the polypropylene resin, and wherein the number of carbons of the polypropylene resin involved in olefinic bonds is less than 5% of the total number of carbon atoms in the resin. In any embodiment, the resin may be free of post-reactor grafted polypropylene or comprises <5 wt. % of post-reactor grafted polypropylene.

Propylene-based polymers useful herein may have a heat distortion temperature of greater than or equal to about 100° C., e.g., 100 to 300° C., 105 to 200° C., 110 to 195° C., 120 to 190° C., 125 to 185° C., 130 to 180° C., determined according to ASTM D648 using a load of 0.45 MPa (66 psi).

Propylene-based polymers useful herein may have an isopentad percentage of greater than 90%, or greater than 95%, or greater than 99%.

Propylene-based polymers according to any of the embodiments disclosed herein may comprise at least 50 mol % propylene, have a melt strength of at least 20 cN determined using an extensional rheometer at 190° C., and an MWD ($M_w/M_n$) of greater than about 5, wherein the resin is produced by contacting propylene monomers at a temperature and a pressure according to any method or process utilizing any embodiment or combination of embodiments of the catalyst system as disclosed in U.S. Ser. No. 61/720,617, filed Oct. 31, 2012, the disclosure of which is incorporated herein by reference in its entirety.

In particular embodiments, propylene-based polymers useful according to any of the embodiments disclosed herein may comprise at least 50 mol % propylene, have a melt strength of at least 20 cN determined using an extensional rheometer at 190° C., and an MWD ($M_w/M_n$) of greater than about 5, wherein the resin is produced by contacting propylene monomers at a temperature and a pressure in the presence of catalyst system comprising a Ziegler-Natta catalyst comprising a non-aromatic internal electron donor and two or more external electron donors. In any embodiment, the first external electron donor may have the formula $R^1_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3_nSi(OR^4)_{4-n}$, wherein each $R^3$ and $R^4$ are independently a hydrocarbyl radical comprising from 1 to 10 carbon atoms, wherein n is 1, 2, or 3; and wherein the second external electron donor is different than the first external electron donor.

Exemplary propylene-based polymers are included in the table below.

TABLE 1

Exemplary Broad Molecular Weight Propylene-based Polymers

| Property | PP1 | PP2 | PP3 | PP4 | PP5 | PP6 | PP7 |
| --- | --- | --- | --- | --- | --- | --- | --- |
| MFR (g/10 min) | 0.9 | 1.0 | 1.4 | 11.7 | 15.6 | 37.8 | 63.4 |
| MWD (PI[1]) | 7.6 | 7.8 | 8.3 | 8.3 | 8.3 | 8.2 | — |
| Tensile at Yield MPa (psi) | 40 (5858) | 39 (5718) | 41 (5893) | 42 (6111) | 43 (6185) | 43 (6200) | 41 (5942) |
| 1% Sec Flex Modulus MPa (kpsi) | 2200 (319) | 2048 (297) | 2276 (330) | 2386 (346) | 2413 (350) | 2428 (352) | 2407 (349) |
| HDT (° C.) | 124 | 125 | 125 | 128 | 127 | 128 | 128 |
| Room Temp. Notched Izod J/m (ft-lbs/in) | 16 (0.3) | 21 (0.4) | 16 (0.3) | 21 (0.4) | 16 (0.3) | 11 (0.2) | 11 (0.2) |
| Rockwell Hardness | 113 | 112 | 113 | 115 | 115 | 116 | 116 |
| Gloss at 60° | 90 | 90 | 90 | 89 | 89 | 89 | 88 |
| Melt Strength (cN) | 43[3] | 52[3]/81 | 30[3] | — | — | — | — |
| Viscosity Ratio[2] | 66 | 41 | 59 | 15 | 20 | 14 | — |

Propylene-Based Elastomer

The propylene-based elastomer is a copolymer of propylene-derived units and units derived from at least one of ethylene or a $C_4$ to $C_{10}$ α-olefin. The copolymer may contain at least about 60.0 wt. %, particularly at least about 75 wt. %, propylene-derived units. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In some embodiments where more than one comonomer derived from at least one of ethylene or a $C_4$ to $C_{10}$ α-olefin is present, the amount of one comonomer may be less than about 5.0 wt. % of the propylene-based elastomer, but the combined amount of comonomers of the propylene-based elastomer is about 5.0 wt. % or greater.

In a preferred embodiment, the comonomer is ethylene, 1-hexene, or 1-octene. In one embodiment, the propylene-based elastomer comprises ethylene-derived units. The propylene-based elastomer may comprise about 5.0 to about 25.0 wt. %, preferably about 8.0 to about 22.5 wt. %, or about 9.0 to about 20.0 wt. % ethylene-derived units of the propylene-based elastomer. In some embodiments, the propylene-based elastomer consists essentially of units derived from propylene and ethylene, i.e., the propylene-based elastomer does not contain any other comonomer in an amount typically present as impurities in the ethylene and/or propylene feedstreams used during polymerization or an amount that would materially affect the heat of fusion, melting point, crystallinity, or melt flow rate of the propylene-based elastomer, or any other comonomer intentionally added to the polymerization process.

The propylene-based elastomer may have a triad tacticity of three propylene units, as measured by $^{13}C$ NMR, of at least about 75.0%, at least about 80.0%, at least about 82.0%, at least about 85.0%, or at least about 90.0%. Preferably, the propylene-based elastomer has a triad tacticity of about 50.0 to about 99.0%, about 60.0 to about 99.0%, more preferably about 75.0 to about 99.0%, or about 80.0 to about 99.0%. In some embodiments, the propylene-based elastomer may have a triad tacticity of about 60.0 to 97.0%.

The propylene-based elastomer has a heat of fusion ("$H_f$"), as determined by DSC, of about 80.0 J/g or less, preferably about 70.0 J/g or less, about 50.0 J/g or less, or about 35.0 J/g or less. The propylene-based elastomer may have a lower limit $H_f$ of about 0.5 J/g, about 1.0 J/g, or about 5.0 J/g. For example, the $H_f$ value may be anywhere from 1.0, 1.5, 3.0, 4.0, 6.0, or 7.0 J/g, to 30.0, 35.0, 40.0, 50.0, 60.0, 70.0, 75.0, or 80.0 J/g.

The propylene-based elastomer may have a percent crystallinity, as determined according to the DSC procedure described herein, of about 2.0 to about 65.0%, preferably about 0.5 to about 40.0%, preferably about 1.0 to about 30.0%, and more preferably about 5.0 to about 35.0%, of isotactic polypropylene. The thermal energy for the highest order of propylene (i.e., 100% crystallinity) is estimated at 189 J/g. In some embodiments, the copolymer has crystallinity less than about 40%, in the range of about 0.25 to about 25.0%, or about 0.5 to about 22.0% of isotactic polypropylene. Embodiments of the propylene-based elastomer may have a tacticity index m/r from a lower limit of about 4 or about 6 to an upper limit of about 8 or about 10 or about 12. In some embodiments, the propylene-based elastomer has an isotacticity index greater than 0%, or within the range having an upper limit of about 50.0% or about 25.0%, and a lower limit of about 3.0% or about 10.0%.

In some embodiments, crystallinity of the propylene-based elastomer is reduced by copolymerization of propylene with limited amounts of one or more comonomers selected from: ethylene, $C_4$ to $C_{20}$ α-olefins, and polyenes. In these copolymers, the amount of propylene-derived units present in the propylene-based elastomer ranges from an upper limit of about 95.0 wt. %, about 94.0 wt. %, about 92.0 wt. %, about 90.0 wt. %, or about 85.0 wt. %, to a lower limit of about 60.0 wt. %, about 65.0 wt. %, about 70.0 wt. %, about 75.0 wt. %, about 80.0 wt. %, about 84.0 wt. %, or about 85.0 wt. % of the propylene-based elastomer.

The propylene-based elastomer may have a single peak melting transition as determined by DSC. In one embodiment, the copolymer has a primary peak transition of about 90° C. or less (e.g., 40 to 50° C.), with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of about 110° C. or less, about 105° C. or less, about 100° C. or less, about 90° C. or less, about 80° C. or less, or about 70° C. or less. In one embodiment, the propylene-based elastomer has a $T_m$ of about 25 to about 105° C., preferably about 60 to about 105° C., about 70 to about 105° C., or about 90 to about 105° C.

The propylene-based elastomer may have a density of about 0.850 to about 0.920 g/cm$^3$, about 0.860 to about 0.900 g/cm$^3$, preferably about 0.860 to about 0.880 g/cm$^3$, at room temperature as measured per ASTM D1505.

The propylene-based elastomer may have a melt flow rate ("MFR"), as measured per ASTM D1238, 2.16 kg at 230° C., of at least about 2 g/10 min. In one embodiment, the propylene-based elastomer has an MFR about 2.0 to about 20.0 g/10 min., about 2.0 to about 10.0 g/10 min., or about 2.0 to about 5.0 g/10 min.

The propylene-based elastomer may have an Elongation at Break of less than about 2000%, less than about 1000%, or less than about 800%, as measured per ASTM D412.

The propylene-based elastomer typically has a weight average molecular weight ($M_w$) of about 5.00×10$^3$ to about 5.00×10$^6$ g/mol, preferably about 1.00×10$^4$ to about 1.00×10$^6$ g/mol, and more preferably about 5.00×10$^4$ to about 4.00×10$^5$ g/mol; a number average molecular weight ($M_n$) of about 2.50×10$^3$ to about 2.50×10$^5$ g/mol, preferably about 1.00×10$^4$ to about 2.50×10$^5$ g/mol, and more preferably about 2.50×10$^4$ to about 2.00×10$^5$ g/mol; and/or a z-average molecular weight ($M_z$) of about 1.00×10$^4$ to about 7.00×10$^6$ g/mol, preferably about 8.00×10$^4$ to about 7.00×10$^5$ g/mol, and more preferably about 1.00×10$^5$ to about 5.00×10$^5$ g/mol. The propylene-based elastomer may have a molecular weight distribution ("MWD") of about 1.5 to about 20, or about 1.5 to about 15, preferably about 1.5 to about 5, and more preferably about 1.8 to about 3, and most preferably about 1.8 to about 2.5.

Preferred propylene-based elastomers are available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands). The particular grade(s) of commercially available propylene-based elastomer suitable for use in the invention can be readily determined using methods commonly known in the art.

In certain embodiments, the propylene-based elastomer is an elastomer having propylene-crystallinity, a melting point by DSC equal to or less than 105° C., and a $H_f$ of from about 5 J/g to about 30 J/g. The propylene-derived units are present in an amount of about 80 to about 90 wt. %, based on the total weight of the propylene-based elastomer. The ethylene-derived units are present in an amount of about 9 to about 18 wt. %, for example, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18 wt. %, based on the total weight of the propylene-based elastomer.

The propylene-based elastomer may comprise copolymers prepared according to the procedures described in PCT Publication Nos. WO 02/36651, WO 00/01745, and U.S. Pat. No. 6,992,158, the contents of which are incorporated herein by reference. Preferred methods for producing the propylene-based elastomer may be found in U.S. Pat. Nos. 7,232,871 and 6,881,800, the contents of which are incorporated herein by reference. The invention is not limited by any particular polymerization method for preparing the propylene-based elastomer, and the polymerization processes are not limited by any particular type of reaction vessel.

End Uses

Blends described herein may be used in a variety of end-use applications. Films comprising such blends are particularly useful. Such films include, for example, monolayer and multilayer blown, extruded, and/or cast stretch and/or shrink films. Film applications improved by higher melt strength, e.g., thick film and geomembrane applications, may be particularly benefited. Other uses may include cling films, sealing films, oriented films, snack packaging, heavy duty bags, grocery sacks, baked and frozen food packaging, medical packaging, industrial liners, membranes, etc., in food-contact and non-food contact applications.

The total thickness of monolayer and multilayer films may vary based upon the application desired. A total film thickness of about 5-100 μm, more typically about 10-50 μm, is suitable for most applications. In some applications, particularly geomembrane applications, the films may have a thickness of 100 μm to 5.0 mm, particularly 1.0 to 5.0 mm, or 2.0 to 4.0 mm. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together, but differing in composition. Coextrusion can be adapted for use in both cast film or blown film processes.

Particular embodiments of the invention relate to monolayer films comprising a blend according to the invention. When used in multilayer films, the blend may be used in any layer of the film, or in more than one layer of the film, as desired. When more than one layer of the film comprises a blend described herein, each such layer can be individually formulated; i.e., the layers comprising a blend as described herein can be of the same or different chemical composition, density, melt index, thickness, etc., depending upon the desired properties of the film. Such films may be formed by any number of well-known extrusion or coextrusion techniques discussed below. Films may be unoriented, uniaxially oriented or biaxially oriented. Physical properties of the film may vary depending on the film forming techniques used.

PARTICULAR EMBODIMENTS

Embodiment A

A polymer composition comprising: (a) an ethylene-based polymer; (b) a propylene-based polymer having a MWD greater than 5.0, particularly 5.0 to 20.0, or about 6.0 to 15.0 and a melt strength of 20.0 cN to 200.0 cN, particularly about 50 cN to 200 cN; and (c) optionally, a propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g.

Embodiment B

A method of making a polymer composition comprising: combining at least the following: (a) an ethylene-based polymer; (b) a propylene-based polymer having a MWD greater than 5.0, particularly 5.0 to 20.0, or about 6.0 to 15.0 and a melt strength of 20.0 cN to 200.0 cN, particularly about 50 cN to 200 cN; and (c) optionally, a propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g.

Embodiment C

A method of improving the melt strength of an ethylene-based polymer comprising: combining the ethylene-based polymer with 12.5 to 30.0 wt. % of a propylene-based polymer having a MWD greater than 5.0, particularly 5.0 to 20.0 wt. %, or about 6.0 to 15.0 wt. %, and a melt strength of 20.0 cN to 200.0 cN.

Embodiment D

Any of Embodiments A to C, wherein the ethylene-based polymer has a density of 0.910 to 0.960 g/cm$^3$, particularly 0.912 to about 0.955 g/cm$^3$, 0.915 to about 0.955 g/cm$^3$, 0.925 to about 0.955 g/cm$^3$, more particularly 0.930 to 0.950 g/cm$^3$, or 0.935 to 0.945 g/cm$^3$.

Embodiment E

Any of Embodiments A to D, wherein the ethylene-based polymer has a CDBI of at least 70%, preferably ≥80.0%, preferably ≥85.0%, preferably ≥90.0%; e.g., 70.0 to 98%, 80.0 to 95.0%, or 85.0 to 90.0%.

Embodiment F

Any of Embodiments A to E, wherein the ethylene-based polymer has 0.05 to 1.0, particularly 0.05 to 0.5, 0.1 to 0.4, or 0.2 to 0.3, long-chain branches per 1000 carbon atoms.

Embodiment G

Any of Embodiments A to F, wherein the ethylene-based polymer comprises about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a complex modulus, $G_{60}^*$, $<2.50\times10^3$ Pa, preferably $<2.00\times10^3$ Pa.

Embodiment H

Any of Embodiments A to G, wherein the ethylene-based polymer of claim 1, having a complex modulus, $G_{50}^*$, $<5.00\times10^3$ Pa.

Embodiment I

Any of Embodiments A to H, wherein the ethylene-based polymer has a complex modulus, $G_{60}^*$, $<2.50\times10^3$ Pa.

Embodiment J

Any of Embodiments A to D, F, or H, wherein the ethylene-based polymer comprises about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a CDBI≥70.0%, preferably ≥80.0%, preferably ≥85.0%, preferably ≥90.0%; a melt index, $I_{2.16}$, of about 0.05 to about 0.50 g/10 min.; a density of from about 0.930 to about 0.950 g/cm$^3$; and a MWD of about 2.5 to about 5.5, preferably 4.0 to 5.0, preferably having a complex modulus, $G_{60}^*$, $<2.50\times10^3$ Pa, preferably $<2.00\times10^3$ Pa.

Embodiment K

Any of Embodiments A to I, wherein the ethylene-based polymer comprises about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a local maximum loss angle at a complex modulus, $G^*$, of $2.50\times10^4$ to $1.00\times10^6$ Pa, preferably $2.50\times10^4$ to $1.00\times10^5$ Pa and a local minimum loss angle at a complex modulus, $G^*$, of $1.00\times10^4$ to $3.00\times10^4$ Pa, preferably $1.25\times10^4$ to $2.00\times10^4$ Pa.

Embodiment L

Any of Embodiments A to K, wherein the ethylene-based polymer has a CDBI≥70.0%; a melt index, $I_{2.16}$, of about 0.05 to about 0.50 g/10 min.; a density of from about 0.930 to about 0.950 g/cm$^3$; and a MWD of about 2.5 to about 5.5.

Embodiment M

Any of Embodiments A, B and D to M, wherein the propylene-based polymer is present in an amount of from 10.0 to 50.0 wt. %, particularly 10.0 to 45.0 wt. %, 10.0 to 40.0 wt. %, or 10.0 to 30.0 wt. % based on the total weight of the composition.

Embodiment N

Any of Embodiments A to M, wherein the propylene-based polymer has a branching index (g') of at least 0.95.

Embodiment O

Any of Embodiments A to N, wherein the propylene-based polymer has a viscosity ratio of from about 35 to about 80 determined from the complex viscosity ratio at 0.01 to 100 rad/s angular frequency at a fixed strain of 10% at 190° C.

Embodiment P

Any of Embodiments A to 0, wherein the propylene-based polymer has a heat distortion temperature of greater than or equal to about 100° C., determined according to ASTM D648 using a load of 0.45 MPa (66 psi).

Embodiment Q

Any of Embodiments A to P, wherein the propylene-based polymer is produced by contacting propylene monomers at propylene polymerization conditions with a catalyst system comprising a Ziegler-Natta catalyst comprising a non-aromatic internal electron donor, and first and second external electron donors comprising different organosilicon compounds.

Embodiment R

Any of Embodiments A to Q, wherein the propylene-based elastomer is present in an amount of from 0.1 to about 25.0 wt. % of one or more propylene-based elastomers, particularly 5.0 to 20.0 wt. %, 5.0 to 15.0 wt. %, or 5.0 to 10.0 wt. %.

Embodiment S

Any of Embodiments A to R, wherein about 8.0 to about 22.5 wt. % of the polymer units in the propylene-based elastomer are ethylene-derived units and the polypropylene-based elastomer has an MFR of about 2.0 to about 30.0 g/10 min.

Embodiment T

Any of Embodiments A to R, wherein the propylene-based elastomer has a weight average molecular weight ($M_w$) of about $5.0\times10^3$ to about $5.0\times10^6$ g/mol.

Embodiment U

Any of Embodiments A to T, wherein the composition has a melt strength of 5.0 to 30.0 cN, particularly 8.0 to 25.0 cN, 9.0 to 20 cN, 10.0 to 18.0 cN, 10.0 to 17.0 cN, or 12.0 to 16.0 cN, determined using an extensional rheometer at 190° C.

Embodiment V

Any of Embodiments A to U, wherein the composition has one or more of the following properties: (i) $G_{50}^*$ of about $2.50\times10^3$ Pa to about $1.0\times10^4$ Pa, preferably $3.00\times10^3$ Pa to about $1.0\times10^4$ Pa; (ii) a $G_{40}^*$, of $1.00\times10^5$ Pa to about $2.0\times10^5$ Pa, particularly $1.25\times10^5$ Pa to about $1.75\times10^5$ Pa, $1.40\times10^5$ Pa to about $1.60\times10^5$ Pa; and/or (iii) a G*value of 5,000 Pa at a loss angle, δ, of 40.0 to 55.0°, particularly 45.0 to 52.5°, or from 45.0 to 50.0°.

Embodiment W

Any of Embodiments A to V, wherein the composition has one or more of the following: (i) a local maximum loss angle at a G* value of $2.50\times10^4$ to $1.00\times10^5$ Pa, $2.50\times10^4$ to $8.0\times10^4$ Pa, or $2.5\times10^4$ to $6.0\times10^4$ Pa; and (ii) a local minimum loss angle at a G* value of $1.00\times10^4$ to $3.00\times10^4$ Pa, $1.25\times10^4$ to $2.50\times10^4$ Pa, or $1.40\times10^4$ to $2.25\times10^4$ Pa.

Embodiment X

A composition formed from at least the following: (a) 65.0 to 90.0 wt. % of an ethylene-based polymer comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a CDBI≥70.0%, preferably ≥80.0%, preferably ≥85.0%, preferably ≥90.0%; a melt index, $I_{2.16}$, of about 0.05 to about 0.50 g/10 min.; a density of from about 0.930 to about 0.950 g/cm³; and a MWD of about 2.5 to about 5.5, preferably 4.0 to 5.0, preferably having a complex modulus, $G_{60}^*$, <$2.50\times10^3$ Pa, preferably <$2.00\times10^3$ Pa; (b) 10.0 to 35.0 wt. % of a propylene-based polymer having a MWD greater than 5.0, particularly 5.0 to 20.0, or about 6.0 to 15.0, and a melt strength of 20.0 cN to 200.0 cN, particularly about 50 cN to 200 cN; and (c) 0 to about 25.0 wt. % particularly 5.0 to 20.0 wt. %, 5.0 to 15.0 wt. %, or 5.0 to 10.0 wt. %, of one or more propylene-based elastomers comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g.

Embodiment Y

A composition formed from at least the following: (a) 65.0 to 90.0 wt. % of an ethylene-based polymer comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a local maximum loss angle at a complex modulus, G*, of $2.50\times10^4$ to $1.00\times10^6$ Pa, preferably $2.50\times10^4$ to $1.00\times10^5$ Pa and a local minimum loss angle at a complex modulus, G*, of $1.00\times10^4$ to $3.00\times10^4$ Pa, preferably $1.25\times10^4$ to $2.00\times10^4$ Pa; (b) 10.0 to 35.0 wt. % of a propylene-based polymer having a MWD greater than 5.0, particularly 5.0 to 20.0, or about 6.0 to 15.0 and a melt strength of 20.0 cN to 200.0 cN, particularly about 50 cN to 200 cN; and (c) 0 to about 25.0 wt. %, particularly 5.0 to 20.0 wt. %, 5.0 to 15.0 wt. %, or 5.0 to 10.0 wt. %, of one or more propylene-based elastomers comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g.

Embodiment Z

Any of Embodiments A to Y, wherein the propylene-based polymer has a branching index (g') of at least 0.95, and a viscosity ratio of from about 35 to about 80 determined from the complex viscosity ratio at 0.01 to 100 rad/s angular frequency at a fixed strain of 10% at 190° C.

Embodiment AA

Any of Embodiments W to Z, wherein the propylene-based polymer has a heat distortion temperature of greater than or equal to about 100° C., determined according to ASTM D648 using a load of 0.45 MPa (66 psi).

Embodiment AB

Any of Embodiments A to AA, wherein the composition has a ESCR of $5.00\times10^2$ to $3.00\times10^3$, particularly $7.50\times10^2$ to $2.50\times10^3$ hours, or $1.00\times10^3$ to $2.0\times10^3$ hours. $5.00\times10^2$ to $3.00\times10^3$, particularly $7.50\times10^2$ to $2.50\times10^3$ hours, or $1.00\times10^3$ to $2.0\times10^3$ hours.

Embodiment AC

An article of manufacture, particularly a film or membrane, formed from any of the compositions or methods of Embodiments A to AB.

Test Methods

The properties described herein can be determined in accordance with the following test procedures. Where any of these properties is referenced in the appended claims, it is to be measured in accordance with the specified test procedure.

Where applicable, the properties and descriptions below are intended to encompass measurements in both the machine and transverse directions. Such measurements are reported separately with the designation "MD" indicating a measurement in the machine direction and "TD" indicating a measurement in the transverse direction.

Gauge (thickness), reported in μm, is measured using a Measuretech Series 200 instrument. The instrument measures film thickness using a capacitance gauge. For each film sample, ten film thickness data points are measured per inch of film as the film is passed through the gauge in a transverse direction. From these measurements, an average gauge measurement is determined and reported. Melt Strength of a polymer at a particular temperature, e.g., 190° C., is determined with a Gottfert Rheotens Melt Strength Apparatus (e.g., Gottfert Rheotens 71.97). The measurement is accomplished by grasping the extrudate from a capillary rheometer (e.g., a Gottfert Rheograph 2002 capillary rheometer), or from an extruder equipped with a capillary die, after the extrudate has been extruded 100 mm using variable speed gears and increasing the gear speed at a constant acceleration (12 mm/s², starting from an initial, zero-force calibration velocity of 10 mm/s) until the molten polymer strand breaks. The force in the strand is measured with a balance beam in conjunction with a linear variable displacement transducer. The force required to extend and then break the extrudate is defined as the melt strength. The force is measured in centinewtons (cN). A typical plot of force vs. wheel velocity is known in the art to include a resonate immediately before the strand breaks. In such cases, the plateau force is approximated by the midline between the oscillations.

Melt Index ($I_{2.16}$) of polymers described herein is determined in accordance with ASTM D1238 under a load of 2.16 kg and at a temperature of 190° C. High-load melt index ($I_{21.6}$) is determined in accordance with ASTM D1238 under a load of 21.6 kg and at a temperature of 190° C. The melt index ratio of a polymer is the ratio of the high-load melt index to the melt index ($I_{21.6}/I_{2.16}$). Melt Flow Rate (MFR) is determined in accordance with ASTM D-1238 under a load of 2.16 kg and at a temperature of 230° C. (i.e., Condition L).

Density of ethylene-based polymers is determined using chips cut from plaques compression molded in accordance with ASTM D1928 Procedure C, aged in accordance with ASTM D618 Procedure A, and measured as specified by ASTM D1505.

Modulus Measurements:

Complex modulus and loss angles, δ, may be obtained from rheological data determined at the test temperature of 190° C. and analyzed using the Van Gurp-Palmen treatment (reference: M. Van Gurp and J. Palmen, Rheology Bulletin, 67, 5, 1998), whereby the loss angle, δ, (wherein δ= $\arctan^{-1}(G''/G')$; G" represents the loss modulus (Pa) and G' represents the storage modulus (Pa)) is plotted against the absolute value of the complex modulus $|G^*|=(G'^2+G''^2)^{1/2}$. This representation of linear viscoelastic data is a powerful means of characterizing molecular and structural features of polymers. For example, low levels of long-chain branching in polyolefins can be detected and quantified on a relative basis, using this methodology. Dynamic shear melt rheological data was measured with an Advanced Rheometrics Expansion System (ARES) using parallel plates (diameter=25 mm) at 190° C. using a pristine compression molded sample at each temperature. The measurements were made over the angular frequency ranged from 0.01-100 rad/s. Depending on the molecular weight and temperature, strains of 10% and 15% were used and linearity of the response was verified. A nitrogen stream was circulated through the sample oven to minimize chain extension or cross-linking during the experiments. All the samples were compression molded at 190° C. and no stabilizers were added. A sinusoidal shear strain is applied to the material. If the strain amplitude is sufficiently small, the material behaves linearly.

Ethylene-Based Polymer Characteristics $M_w$, $M_n$, MWD: MWD is defined as $M_w/M_n$. The expression $M_w/M_n$ is the ratio of the weight average molecular weight ($M_w$) to the number average molecular weight ($M_n$). The weight average molecular weight is given by $$M_w = \frac{\sum_i n_i M_i^2}{\sum_i n_i M_i}$$

The number average molecular weight is given by $$M_n = \frac{\sum_i n_i M_i}{\sum_i n_i}$$

The z-average molecular weight is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, vol. 34, no. 19, p. 6812 (2001).

Short Chain Branching Characteristics:

The term "Composition distribution breadth index" (CDBI) is defined as the weight percentage of the copolymer molecules having a comonomer content within 50% (i.e., within ±25%) of the median total molar comonomer content. The CDBI of a copolymer is readily determined utilizing well known techniques for isolating individual fractions of a sample of the copolymer. One such technique is Temperature Rising Elution Fractionation (TREF), as described in Wild, et al., J. Poly. Sci. Poly. Phys. Ed., vol. 20, p. 441 (1982), which is incorporated herein by reference.

To determine CDBI, a solubility distribution curve is first generated for the copolymer. This may be accomplished using data acquired from TREF techniques described above. This solubility distribution curve is a plot of the weight fraction of the copolymer that is solubilized as a function of temperature. This is converted to a weight fraction versus composition distribution curve. For the purpose of simplifying the correlation of composition with elution temperature, the weight fractions less than 15,000 are ignored. The remainder of this description and the appended claims maintain this convention of ignoring weight fractions below 15,000 in the CDBI measurements. Further details of determining CDBI of a copolymer are known to those skilled in the art, see, for example, PCT Publication No. WO 93/03093, published Feb. 18, 1993.

Solubility distribution breadth index ("SDBI") is used as a measure of the breadth of the solubility distribution curve for a given polymer. The procedure used herein for calculating SDBI is as described in PCT Publication No. WO 93/03093, pp. 16-18, published Feb. 18, 1993.

Both CDBI and SDBI may be determined using data obtained via CRYSTAF. In such cases, a commercial CRYSTAF model 200 instrument (PolymerChar S.A.) is used for chemical composition distribution (CCD) analysis. Approximately 20 to 30 mg of polymer is placed into each reactor and dissolved in 30 mL of 1,2 dichlorobenzene at 160° C. for approximately 60 minutes, then allowed to equilibrate for approximately 45 minutes at 100° C. The polymer solution is then cooled to either 30° C. (standard procedure) or 0° C. (cryo procedure) using a cooling rate of 0.2° C./min. A two wavelength infrared detector is then used to measure the polymer concentration during crystallization (3.5 µm, 2853 $cm^{-1}$ sym. stretch) and to compensate for base line drifts (3.6 µm) during the analysis time. The solution concentration is monitored at certain temperature intervals, yielding a cumulative concentration curve. The derivative of this curve with respect to temperature represents the weight fraction of crystallized polymer at each temperature. In both standard and cryo procedures, any resin in solution below the temperature to which the solution is cooled is defined as "% solubles". The cryo procedure outlined above, i.e., cooling to 0° C., typically provides greater detail, especially for amorphous samples that tend to stay in solution at or around 30° C.

Long-Chain Branching:

Various methods are known for determining the presence of long-chain branches. For example, long-chain branching can be determined using $^{13}C$ nuclear magnetic resonance (NMR) spectroscopy and to a limited extent, e.g., for ethylene homopolymers and for certain copolymers, and it can be quantified using the method of Randall (Journal of Macromolecular Science, Rev. Macromol. Chem. Phys., C29 (2&3), pp. 285-297). Although conventional $^{13}C$ NMR spectroscopy cannot determine the length of a long-chain branch in excess of about six carbon atoms, there are other known techniques useful for quantifying or determining the presence of long-chain branches in ethylene-based polymers, such as ethylene/1-octene interpolymers. For those ethylene-based polymers wherein the $^{13}$C resonances of the comonomer overlap completely with the $^{13}$C resonances of the long-chain branches, either the comonomer or the other monomers (such as ethylene) can be isotopically labeled so that the long-chain branches can be distinguished from the comonomer. For example, a copolymer of ethylene and 1-octene can be prepared using $^{13}$C-labeled ethylene. In this case, the resonances associated with macromer incorporation will be significantly enhanced in intensity and will show coupling to neighboring $^{13}$C carbons, whereas the octene resonances will be unenhanced.

Alternatively, the degree of long-chain branching in ethylene-based polymers may be quantified by determination of the branching index. The branching index g' is defined by the following equation:

$$g' = \frac{IV_{Br}}{IV_{Lin}}\bigg|_{M_w}$$

where g' is the branching index, $IV_{Br}$ is the intrinsic viscosity of the branched ethylene-based polymer, and $IV_{Lin}$ is the intrinsic viscosity of the corresponding linear ethylene-based polymer having the same weight average molecular weight and molecular weight distribution as the branched ethylene-based polymer and in the case of copolymers and terpolymers, substantially the same relative molecular proportion or proportions of monomer units. For these purposes, the molecular weight and molecular weight distribution are considered "the same" if the respective values for the branched polymer and the corresponding linear polymer are within 10% of each other. Preferably, the molecular weights are the same and the MWD of the polymers are within 10% of each other. A method for determining intrinsic viscosity of polyethylene is described in Macromolecules, 2000, 33, pp. 7489-7499. Intrinsic viscosity may be determined by dissolving the linear and branched polymers in an appropriate solvent, e.g. trichlorobenzene, typically measured at 135° C. Another method for measuring the intrinsic viscosity of a polymer is ASTM D-5225-98—Standard Test Method for Measuring Solution Viscosity of Polymers with a Differential Viscometer, which is incorporated by reference herein in its entirety.

The branching index, g', is inversely proportional to the amount of branching. Thus, lower values for g' indicate relatively higher amounts of branching. The amounts of short and long-chain branching each contribute to the branching index according to the formula: $g'=g'_{LCB} \times g'_{SCB}$. Thus, the branching index due to long-chain branching may be calculated from the experimentally determined value for g' as described by Scholte, et al., in J. App. Polymer Sci., 29, pp. 3763-3782 (1984), incorporated herein by reference.

Strain Hardening Ratio is defined as the ratio of two extensional viscosities: the numerator measured using an extensional viscometer reporting the maximum viscosity (at break), and the denominator being an extensional viscosity calculated from small amplitude strain experimental data using the method of Baumgaertel and Winter. The extensional viscosities are measured using the same experimental conditions (i.e., temperature, stabilization, etc.) as described in U.S. Pat. No. 6,225,432, incorporated herein by reference in its entirety.

Propylene-Based Polymer and Elastomer Characteristics:

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso, and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

For purposes herein, $M_w$, $M_z$ number of carbon atoms, g value and $g'_{vis}$ of the propylene-based polymer may be determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, vol. 34, no. 19, pp. 6812-6820, (2001), and references therein. Three Polymer Laboratories PLgel 10 mm Mixed-B LS columns are used. The nominal flow rate is 0.5 cm$^3$/min., and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm$^3$, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers, and 0.1 otherwise, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits. The branching index $g'_{vis}$, which is also referred to simply as g' is defined as:

$$g'_{vis} = \frac{[\eta]_{avg}}{kM_v^\alpha}$$

where, for purpose of this invention and claims thereto, $\alpha$=0.695 and k=0.000579 for linear ethylene polymers, $\alpha$=0.705 k=0.000262 for linear propylene polymers, and $\alpha$=0.695 and k=0.000181 for linear butene polymers. $M_v$ is the viscosity-average molecular weight based on molecular weights determined by LS analysis.

The term "g" also called a "g value" is defined to be $Rg^2_{pm}/Rg^2_{ls}$, where $Rg_{pm}$ is the radius of gyration for the polymacromer, $Rg^2_{ls}$ is the radius of gyration for the linear standard, and $Rg_{ls}=K_s M^{0.58}$ where $K_s$ is the power law coefficient (0.023 for linear polyethylene, 0.0171 for linear polypropylene, and 0.0145 for linear polybutene), and M is the molecular weight as described above, $Rg_{pm}=K_T M^{\alpha_s}$. $\alpha_s$ is the size coefficient for the polymacromer, $K_T$ is the power law coefficient for the polymacromer. See Macromolecules, 2001, vol. 34, pp. 6812-6820, for guidance on selecting a linear standard having the molecular weight and comonomer content, and determining K coefficients and $\alpha$ exponents.

EXAMPLES

Example 1 an ethylene-based/1-hexene copolymer (PE1) is prepared using a metallocene catalyst and gas phase process having a CBDI≥70.0, a density of 0.940 g/cm³, a melt index ($I_{2.16}$) of 0.15 g/10 min., a melt index ratio ($I_{21.6}/I_{2.16}$) of 70.0 (available from ExxonMobil Chemical Company as developmental grade EXP-605). Rheological data is collected on an MCR501 Rheometer at 190° C. and analyzed with RHEOPLUS/32 V2.81 at am amplitude gamma of 5% with Angular Frequency omega=500 . . . 0.01 rad/s log; |Slope|=4.8946897 Pt./dec. Results are reported in Table 2.

TABLE 2

| | | | | | | Rheological Properties of Example 1 | | | | | | | |
|---|---|---|---|---|---|---|---|---|---|---|---|---|---|
| Meas. Pts. | Time [min] | Ang. Freq. [rad/s] | G' [Pa] | G" [Pa] | G* [Pa] | eta' [Pa·s] | eta" [Pa·s] | eta* [Pa·s] | tan delta [1] | delta [°] | Torque [mNm] | Strain [%] | Angle [mrad] |
| 1 | 0.137 | 500 | 378,000 | 229,000 | 442,000 | 457 | 756 | 884 | 0.605 | 31.2 | 67.5 | 4.98 | 7.57 |
| 2 | 0.321 | 312 | 313,000 | 205,000 | 375,000 | 657 | 1,000 | 1,200 | 0.655 | 33.2 | 57.4 | 4.99 | 7.59 |
| 3 | 0.515 | 195 | 256,000 | 181,000 | 313,000 | 928 | 1,310 | 1,610 | 0.708 | 35.3 | 48 | 4.99 | 7.59 |
| 4 | 0.686 | 122 | 206,000 | 157,000 | 259,000 | 1,290 | 1,690 | 2,120 | 0.764 | 37.4 | 39.7 | 4.99 | 7.59 |
| 5 | 0.796 | 76.2 | 163,000 | 135,000 | 212,000 | 1,770 | 2,150 | 2,780 | 0.823 | 39.5 | 32.5 | 5.01 | 7.61 |
| 6 | 0.972 | 47.6 | 128,000 | 113,000 | 171,000 | 2,370 | 2,700 | 3,590 | 0.878 | 41.3 | 26.2 | 5 | 7.61 |
| 7 | 1.17 | 29.7 | 99,900 | 93,100 | 137,000 | 3,130 | 3,360 | 4,590 | 0.932 | 43 | 21 | 5 | 7.6 |
| 8 | 1.34 | 18.6 | 77,200 | 75,600 | 108,000 | 4,070 | 4,160 | 5,820 | 0.979 | 44.4 | 16.6 | 5 | 7.6 |
| 9 | 1.49 | 11.6 | 59,600 | 60,600 | 85,000 | 5,230 | 5,140 | 7,330 | 1.02 | 45.5 | 13 | 5 | 7.6 |
| 10 | 1.67 | 7.25 | 45,900 | 47,900 | 66,400 | 6,610 | 6,340 | 9,160 | 1.04 | 46.2 | 10.2 | 5 | 7.6 |
| 11 | 1.91 | 4.53 | 35,600 | 37,600 | 51,800 | 8,310 | 7,850 | 11,400 | 1.06 | 46.6 | 7.94 | 5 | 7.6 |
| 12 | 2.2 | 2.83 | 27,700 | 29,400 | 40,400 | 10,400 | 9,800 | 14,300 | 1.06 | 46.7 | 6.2 | 5 | 7.6 |
| 13 | 2.58 | 1.77 | 21,800 | 23,000 | 31,600 | 13,000 | 12,300 | 17,900 | 1.05 | 46.5 | 4.85 | 5 | 7.6 |
| 14 | 3.07 | 1.1 | 17,200 | 18,000 | 24,900 | 16,300 | 15,600 | 22,500 | 1.04 | 46.2 | 3.81 | 5 | 7.6 |
| 15 | 3.7 | 0.69 | 13,600 | 14,100 | 19,600 | 20,500 | 19,800 | 28,500 | 1.04 | 46.1 | 3.01 | 5 | 7.6 |
| 16 | 4.65 | 0.431 | 10,700 | 11,200 | 15,500 | 26,000 | 24,900 | 36,000 | 1.04 | 46.2 | 2.38 | 5 | 7.6 |
| 17 | 6.12 | 0.269 | 8,440 | 8,900 | 12,300 | 33,100 | 31,400 | 45,600 | 1.05 | 46.5 | 1.88 | 5 | 7.6 |

TABLE 2-continued

Rheological Properties of Example 1

| Meas. Pts. | Time [min] | Ang. Freq. [rad/s] | G' [Pa] | G" [Pa] | G* [Pa] | eta' [Pa · s] | eta" [Pa · s] | eta* [Pa · s] | tan delta [1] | delta [°] | Torque [mNm] | Strain [%] | Angle [mrad] |
|---|---|---|---|---|---|---|---|---|---|---|---|---|---|
| 18 | 8.4 | 0.168 | 6,600 | 7,120 | 9,710 | 42,300 | 39,200 | 57,700 | 1.08 | 47.2 | 1.49 | 5 | 7.6 |
| 19 | 12 | 0.105 | 5,080 | 5,720 | 7,650 | 54,400 | 48,300 | 72,800 | 1.13 | 48.4 | 1.17 | 5 | 7.6 |
| 20 | 17.5 | 0.0656 | 3,910 | 4,580 | 6,030 | 69,800 | 59,600 | 91,800 | 1.17 | 49.5 | 0.924 | 5 | 7.6 |
| 21 | 26.1 | 0.041 | 2,940 | 3,680 | 4,710 | 89,700 | 71,800 | 115,000 | 1.25 | 51.3 | 0.723 | 5 | 7.6 |
| 22 | 39.3 | 0.0256 | 2,210 | 2,940 | 3,680 | 115,000 | 86,400 | 144,000 | 1.33 | 53.1 | 0.565 | 5 | 7.6 |
| 23 | 60.1 | 0.016 | 1,630 | 2,330 | 2,850 | 146,000 | 102,000 | 178,000 | 1.43 | 55 | 0.437 | 5 | 7.6 |
| 24 | 92.4 | 0.01 | 1,170 | 1,840 | 2,180 | 184,000 | 117,000 | 218,000 | 1.57 | 57.5 | 0.334 | 5 | 7.6 |

Example 2

A composition comprising 95.0 wt. % PE1 and 5.0 wt. % of a broad molecular-weight propylene-based polymer (PP2 of Table 1 and corresponding to Example 2 of U.S. Ser. No. 61/720,617 filed Oct. 31, 2012) (available from ExxonMobil Chemical Company) is prepared on a Haake twin screw extrusion unit containing a rod-type die at BTEC PTL laboratory. The extruder dimensions (L×W×H) were 745× 420×1200 mm. The extruder has a barrel diameter of 31.8/20 mm and the cylinder length is 300 mm. The extruder is operated at a speed of 55 rpm with Zones 1, 2, and 3 at a set point temperature of 190° C., 200° C., and 205° C., respectively. The adaptor (Zone 4) and die (Zone 5) are set at 210° C. and 185° C., respectively. Rheological data is reported in Table 3.

Example 3

Example 2 is substantially reproduced except that 90.0 wt. % PE1 and 10.0 wt. % PP2 are used. Rheological data is reported in Table 4.

Example 4

Example 2 is substantially reproduced except that 80.0 wt. % PE1 and 20.0 wt. % PP2 are used. Rheological data is reported in Table 5.

Example 5

Example 2 is substantially reproduced except that the composition comprises 90.0 wt. % PE1 and 5.0 wt. % PP2 and 5.0 wt. % of a propylene-based elastomer (PBE1) having a MFR of 2.0, a melt index $I_{2.16}$ (190° C./2.16 kg) of 1.1 g/10 min., a density of 0.874 g/cm$^3$, and an ethylene content of 11 wt. % (available from ExxonMobil Chemical Company as Vistamaxx™ 3020 propylene-based elastomer). Rheological data is reported in Table 6.

Example 6

Example 5 is substantially reproduced except that 85.0 wt. % PE1, 10.0 wt. % PP2, and 5.0 wt. % PBE1 are used. Rheological data is reported in Table 7.

TABLE 3

Rheological Properties of Example 2

| Meas. Pts. | Time [min] | Ang. Freq. [rad/s] | G' [Pa] | G" [Pa] | G* [Pa] | eta' [Pa · s] | eta" [Pa · s] | eta* [Pa · s] | tan delta [1] | delta [°] | Torque [mNm] | Strain [%] | Angle [mrad] |
|---|---|---|---|---|---|---|---|---|---|---|---|---|---|
| 1 | 0.136 | 500 | 356,000 | 213,000 | 415,000 | 425 | 712 | 830 | 0.597 | 30.8 | 63.4 | 4.98 | 7.57 |
| 2 | 0.324 | 312 | 296,000 | 191,000 | 352,000 | 612 | 948 | 1,130 | 0.646 | 32.9 | 54 | 4.99 | 7.59 |
| 3 | 0.519 | 195 | 242,000 | 169,000 | 295,000 | 866 | 1,240 | 1,510 | 0.697 | 34.9 | 45.3 | 4.99 | 7.59 |
| 4 | 0.694 | 122 | 196,000 | 147,000 | 245,000 | 1,210 | 1,600 | 2,010 | 0.752 | 36.9 | 37.5 | 4.99 | 7.59 |
| 5 | 0.769 | 76.2 | 156,000 | 127,000 | 201,000 | 1,670 | 2,040 | 2,640 | 0.816 | 39.2 | 30.9 | 5.01 | 7.62 |
| 6 | 0.941 | 47.6 | 123,000 | 106,000 | 162,000 | 2,230 | 2,580 | 3,410 | 0.863 | 40.8 | 24.9 | 5 | 7.61 |
| 7 | 1.13 | 29.7 | 95,900 | 87,800 | 130,000 | 2,950 | 3,230 | 4,380 | 0.916 | 42.5 | 20 | 5 | 7.6 |
| 8 | 1.3 | 18.6 | 74,400 | 71,600 | 103,000 | 3,860 | 4,010 | 5,560 | 0.963 | 43.9 | 15.9 | 5 | 7.6 |
| 9 | 1.45 | 11.6 | 57,600 | 57,600 | 81,500 | 4,970 | 4,960 | 7,020 | 1 | 45 | 12.5 | 5 | 7.6 |
| 10 | 1.63 | 7.25 | 44,500 | 45,800 | 63,800 | 6,310 | 6,130 | 8,800 | 1.03 | 45.8 | 9.78 | 5 | 7.6 |
| 11 | 1.87 | 4.53 | 34,500 | 36,000 | 49,900 | 7,960 | 7,610 | 11,000 | 1.05 | 46.3 | 7.65 | 5 | 7.6 |
| 12 | 2.16 | 2.83 | 26,900 | 28,200 | 39,000 | 9,980 | 9,510 | 13,800 | 1.05 | 46.4 | 5.98 | 5 | 7.6 |
| 13 | 2.54 | 1.77 | 21,100 | 22,100 | 30,600 | 12,500 | 12,000 | 17,300 | 1.05 | 46.3 | 4.69 | 5 | 7.6 |
| 14 | 3.03 | 1.1 | 16,600 | 17,300 | 24,000 | 15,700 | 15,100 | 21,800 | 1.04 | 46.2 | 3.68 | 5 | 7.6 |
| 15 | 3.66 | 0.69 | 13,100 | 13,700 | 18,900 | 19,800 | 19,000 | 27,500 | 1.04 | 46.1 | 2.91 | 5 | 7.6 |
| 16 | 4.61 | 0.431 | 10,300 | 10,800 | 15,000 | 25,100 | 24,000 | 34,700 | 1.05 | 46.3 | 2.29 | 5 | 7.6 |
| 17 | 6.08 | 0.269 | 8,110 | 8,600 | 11,800 | 31,900 | 30,100 | 43,900 | 1.06 | 46.7 | 1.81 | 5 | 7.6 |
| 18 | 8.36 | 0.168 | 6,340 | 6,880 | 9,350 | 40,900 | 37,700 | 55,600 | 1.09 | 47.3 | 1.43 | 5 | 7.6 |
| 19 | 11.9 | 0.105 | 4,930 | 5,510 | 7,400 | 52,400 | 47,000 | 70,400 | 1.12 | 48.2 | 1.13 | 5 | 7.6 |
| 20 | 17.4 | 0.0656 | 3,770 | 4,430 | 5,810 | 67,500 | 57,400 | 88,600 | 1.18 | 49.6 | 0.892 | 5 | 7.6 |
| 21 | 26 | 0.041 | 2,880 | 3,550 | 4,570 | 86,600 | 70,300 | 111,000 | 1.23 | 50.9 | 0.701 | 5 | 7.6 |
| 22 | 39.3 | 0.0256 | 2,150 | 2,840 | 3,560 | 111,000 | 83,800 | 139,000 | 1.32 | 52.9 | 0.546 | 5 | 7.6 |
| 23 | 60.1 | 0.016 | 1,590 | 2,260 | 2,760 | 141,000 | 99,100 | 173,000 | 1.43 | 55 | 0.424 | 5 | 7.6 |
| 24 | 92.2 | 0.01 | 1,160 | 1,790 | 2,130 | 179,000 | 116,000 | 213,000 | 1.55 | 57.1 | 0.327 | 5 | 7.6 |

TABLE 4

Rheological Properties of Example 3

| Meas. Pts. | Time [min] | Ang. Freq. [rad/s] | G' [Pa] | G" [Pa] | G* [Pa] | eta' [Pa·s] | eta" [Pa·s] | eta* [Pa·s] | tan delta [1] | delta [°] | Torque [mNm] | Strain [%] | Angle [mrad] |
|---|---|---|---|---|---|---|---|---|---|---|---|---|---|
| 1 | 0.135 | 500 | 342,000 | 202,000 | 397,000 | 404 | 683 | 794 | 0.591 | 30.6 | 60.6 | 4.98 | 7.57 |
| 2 | 0.325 | 312 | 285,000 | 182,000 | 338,000 | 582 | 912 | 1,080 | 0.639 | 32.6 | 51.8 | 4.99 | 7.59 |
| 3 | 0.521 | 195 | 234,000 | 161,000 | 284,000 | 826 | 1,200 | 1,450 | 0.689 | 34.6 | 43.5 | 4.99 | 7.59 |
| 4 | 0.699 | 122 | 189,000 | 140,000 | 236,000 | 1,150 | 1,550 | 1,930 | 0.743 | 36.6 | 36.1 | 4.99 | 7.59 |
| 5 | 0.774 | 76.2 | 151,000 | 122,000 | 194,000 | 1,600 | 1,980 | 2,540 | 0.806 | 38.9 | 29.7 | 5 | 7.61 |
| 6 | 0.943 | 47.6 | 120,000 | 102,000 | 157,000 | 2,140 | 2,510 | 3,300 | 0.851 | 40.4 | 24.1 | 5 | 7.61 |
| 7 | 1.13 | 29.7 | 93,600 | 84,500 | 126,000 | 2,840 | 3,150 | 4,240 | 0.903 | 42.1 | 19.3 | 5 | 7.6 |
| 8 | 1.29 | 18.6 | 72,800 | 69,100 | 100,000 | 3,720 | 3,920 | 5,400 | 0.949 | 43.5 | 15.4 | 5 | 7.6 |
| 9 | 1.44 | 11.6 | 56,400 | 55,700 | 79,300 | 4,800 | 4,860 | 6,840 | 0.988 | 44.7 | 12.2 | 5 | 7.6 |
| 10 | 1.63 | 7.25 | 43,600 | 44,400 | 62,200 | 6,120 | 6,020 | 8,590 | 1.02 | 45.5 | 9.55 | 5 | 7.6 |
| 11 | 1.86 | 4.53 | 33,900 | 35,000 | 48,700 | 7,740 | 7,480 | 10,800 | 1.03 | 46 | 7.47 | 5 | 7.6 |
| 12 | 2.16 | 2.83 | 26,400 | 27,500 | 38,200 | 9,730 | 9,350 | 13,500 | 1.04 | 46.2 | 5.85 | 5 | 7.6 |
| 13 | 2.53 | 1.77 | 20,800 | 21,600 | 29,900 | 12,200 | 11,700 | 16,900 | 1.04 | 46.1 | 4.59 | 5 | 7.6 |
| 14 | 3.02 | 1.1 | 16,400 | 16,900 | 23,600 | 15,300 | 14,800 | 21,300 | 1.04 | 46 | 3.61 | 5 | 7.6 |
| 15 | 3.65 | 0.69 | 13,000 | 13,400 | 18,600 | 19,400 | 18,800 | 27,000 | 1.03 | 45.9 | 2.86 | 5 | 7.6 |
| 16 | 4.6 | 0.431 | 10,200 | 10,600 | 14,700 | 24,500 | 23,700 | 34,100 | 1.03 | 45.9 | 2.26 | 5 | 7.6 |
| 17 | 6.07 | 0.269 | 8,050 | 8,400 | 11,600 | 31,200 | 29,900 | 43,200 | 1.04 | 46.2 | 1.78 | 5 | 7.6 |
| 18 | 8.36 | 0.168 | 6,310 | 6,720 | 9,210 | 39,900 | 37,500 | 54,800 | 1.07 | 46.8 | 1.41 | 5 | 7.6 |
| 19 | 11.9 | 0.105 | 4,890 | 5,390 | 7,280 | 51,300 | 46,600 | 69,300 | 1.1 | 47.8 | 1.12 | 5 | 7.6 |
| 20 | 17.4 | 0.0656 | 3,810 | 4,330 | 5,770 | 66,000 | 58,000 | 87,800 | 1.14 | 48.7 | 0.884 | 5 | 7.6 |
| 21 | 26 | 0.041 | 2,900 | 3,480 | 4,530 | 85,000 | 70,700 | 111,000 | 1.2 | 50.2 | 0.695 | 5 | 7.6 |
| 22 | 39.3 | 0.0256 | 2,200 | 2,800 | 3,570 | 109,000 | 86,000 | 139,000 | 1.27 | 51.8 | 0.547 | 5 | 7.6 |
| 23 | 60.1 | 0.016 | 1,660 | 2,250 | 2,790 | 140,000 | 104,000 | 174,000 | 1.35 | 53.5 | 0.428 | 5 | 7.6 |
| 24 | 92.4 | 0.01 | 1,220 | 1,780 | 2,160 | 178,000 | 122,000 | 216,000 | 1.47 | 55.7 | 0.331 | 5 | 7.6 |

TABLE 5

Rheological Properties of Example 4

| Meas. Pts. | Time [min] | Ang. Freq. [rad/s] | G' [Pa] | G" [Pa] | G* [Pa] | eta' [Pa·s] | eta" [Pa·s] | eta* [Pa·s] | tan delta [1] | delta [°] | Torque [mNm] | Strain [%] | Angle [mrad] |
|---|---|---|---|---|---|---|---|---|---|---|---|---|---|
| 1 | 0.132 | 500 | 312,000 | 178,000 | 359,000 | 357 | 623 | 718 | 0.573 | 29.8 | 54.8 | 4.98 | 7.57 |
| 2 | 0.329 | 312 | 261,000 | 161,000 | 307,000 | 517 | 836 | 983 | 0.618 | 31.7 | 47.1 | 4.99 | 7.59 |
| 3 | 0.526 | 195 | 216,000 | 144,000 | 259,000 | 736 | 1,110 | 1,330 | 0.666 | 33.7 | 39.7 | 4.99 | 7.59 |
| 4 | 0.71 | 122 | 176,000 | 126,000 | 216,000 | 1,030 | 1,440 | 1,770 | 0.717 | 35.6 | 33.1 | 4.99 | 7.59 |
| 5 | 0.785 | 76.2 | 141,000 | 110,000 | 178,000 | 1,440 | 1,850 | 2,340 | 0.779 | 37.9 | 27.3 | 4.99 | 7.58 |
| 6 | 0.944 | 47.6 | 113,000 | 92,400 | 146,000 | 1,940 | 2,370 | 3,060 | 0.821 | 39.4 | 22.4 | 5 | 7.61 |
| 7 | 1.13 | 29.7 | 88,700 | 77,300 | 118,000 | 2,600 | 2,990 | 3,960 | 0.871 | 41.1 | 18.1 | 5 | 7.6 |
| 8 | 1.27 | 18.6 | 69,500 | 63,700 | 94,300 | 3,430 | 3,740 | 5,080 | 0.917 | 42.5 | 14.5 | 5 | 7.61 |
| 9 | 1.42 | 11.6 | 54,100 | 51,800 | 74,900 | 4,460 | 4,660 | 6,450 | 0.957 | 43.7 | 11.5 | 5 | 7.6 |
| 10 | 1.61 | 7.25 | 42,000 | 41,500 | 59,100 | 5,730 | 5,800 | 8,150 | 0.988 | 44.6 | 9.06 | 5 | 7.6 |
| 11 | 1.84 | 4.53 | 32,700 | 33,000 | 46,500 | 7,290 | 7,230 | 10,300 | 1.01 | 45.3 | 7.13 | 5 | 7.6 |
| 12 | 2.14 | 2.83 | 25,600 | 26,100 | 36,500 | 9,230 | 9,040 | 12,900 | 1.02 | 45.6 | 5.6 | 5 | 7.6 |
| 13 | 2.51 | 1.77 | 20,100 | 20,600 | 28,700 | 11,600 | 11,400 | 16,300 | 1.03 | 45.7 | 4.41 | 5 | 7.6 |
| 14 | 3 | 1.1 | 15,800 | 16,200 | 22,600 | 14,700 | 14,300 | 20,500 | 1.03 | 45.8 | 3.47 | 5 | 7.6 |
| 15 | 3.63 | 0.69 | 12,400 | 12,800 | 17,800 | 18,500 | 18,000 | 25,800 | 1.03 | 45.8 | 2.73 | 5 | 7.6 |
| 16 | 4.58 | 0.431 | 9,790 | 10,100 | 14,100 | 23,500 | 22,700 | 32,700 | 1.03 | 45.9 | 2.16 | 5 | 7.6 |
| 17 | 6.05 | 0.269 | 7,700 | 8,020 | 11,100 | 29,800 | 28,600 | 41,300 | 1.04 | 46.2 | 1.71 | 5 | 7.6 |
| 18 | 8.34 | 0.168 | 6,050 | 6,390 | 8,800 | 38,000 | 36,000 | 52,300 | 1.06 | 46.6 | 1.35 | 5 | 7.6 |
| 19 | 11.9 | 0.105 | 4,760 | 5,100 | 6,970 | 48,500 | 45,300 | 66,400 | 1.07 | 47 | 1.07 | 5 | 7.6 |
| 20 | 17.4 | 0.0656 | 3,710 | 4,080 | 5,510 | 62,200 | 56,500 | 84,000 | 1.1 | 47.8 | 0.846 | 5 | 7.6 |
| 21 | 26 | 0.041 | 2,900 | 3,270 | 4,370 | 79,800 | 70,800 | 107,000 | 1.13 | 48.4 | 0.671 | 5 | 7.6 |
| 22 | 39.3 | 0.0256 | 2,230 | 2,630 | 3,450 | 103,000 | 87,200 | 135,000 | 1.18 | 49.7 | 0.529 | 5 | 7.6 |
| 23 | 60 | 0.016 | 1,720 | 2,110 | 2,720 | 132,000 | 107,000 | 170,000 | 1.23 | 50.9 | 0.418 | 5 | 7.6 |
| 24 | 92.3 | 0.01 | 1,310 | 1,700 | 2,140 | 170,000 | 131,000 | 214,000 | 1.3 | 52.4 | 0.329 | 5 | 7.6 |

TABLE 6

Rheological Properties of Example 5

| Meas. Pts. | Time [min] | Ang. Freq. [rad/s] | G' [Pa] | G" [Pa] | G* [Pa] | eta' [Pa·s] | eta" [Pa·s] | eta* [Pa·s] | tan delta [1] | delta [°] | Torque [mNm] | Strain [%] | Angle [mrad] |
|---|---|---|---|---|---|---|---|---|---|---|---|---|---|
| 1 | 0.135 | 500 | 354,000 | 209,000 | 411,000 | 418 | 708 | 822 | 0.59 | 30.5 | 62.8 | 4.98 | 7.57 |
| 2 | 0.324 | 312 | 295,000 | 188,000 | 350,000 | 603 | 944 | 1,120 | 0.639 | 32.6 | 53.6 | 4.99 | 7.59 |
| 3 | 0.52 | 195 | 242,000 | 167,000 | 294,000 | 857 | 1,240 | 1,510 | 0.691 | 34.6 | 45 | 4.99 | 7.59 |
| 4 | 0.696 | 122 | 196,000 | 146,000 | 244,000 | 1,200 | 1,600 | 2,000 | 0.747 | 36.7 | 37.4 | 4.99 | 7.59 |
| 5 | 0.771 | 76.2 | 156,000 | 126,000 | 200,000 | 1,660 | 2,040 | 2,630 | 0.813 | 39.1 | 30.8 | 5.01 | 7.62 |
| 6 | 0.943 | 47.6 | 123,000 | 106,000 | 162,000 | 2,220 | 2,580 | 3,410 | 0.862 | 40.7 | 24.9 | 5 | 7.61 |

TABLE 6-continued

Rheological Properties of Example 5

| Meas. Pts. | Time [min] | Ang. Freq. [rad/s] | G' [Pa] | G" [Pa] | G* [Pa] | eta' [Pa·s] | eta" [Pa·s] | eta* [Pa·s] | tan delta [1] | delta [°] | Torque [mNm] | Strain [%] | Angle [mrad] |
|---|---|---|---|---|---|---|---|---|---|---|---|---|---|
| 7 | 1.13 | 29.7 | 95,800 | 87,800 | 130,000 | 2,950 | 3,220 | 4,370 | 0.917 | 42.5 | 19.9 | 5 | 7.6 |
| 8 | 1.3 | 18.6 | 74,100 | 71,700 | 103,000 | 3,860 | 3,990 | 5,550 | 0.967 | 44 | 15.8 | 5 | 7.6 |
| 9 | 1.45 | 11.6 | 57,200 | 57,700 | 81,200 | 4,970 | 4,930 | 7,000 | 1.01 | 45.3 | 12.5 | 5 | 7.6 |
| 10 | 1.64 | 7.25 | 44,000 | 45,800 | 63,500 | 6,310 | 6,070 | 8,760 | 1.04 | 46.1 | 9.74 | 5 | 7.6 |
| 11 | 1.87 | 4.53 | 34,000 | 36,000 | 49,500 | 7,940 | 7,510 | 10,900 | 1.06 | 46.6 | 7.59 | 5 | 7.6 |
| 12 | 2.17 | 2.83 | 26,500 | 28,100 | 38,600 | 9,930 | 9,350 | 13,600 | 1.06 | 46.7 | 5.92 | 5 | 7.6 |
| 13 | 2.54 | 1.77 | 20,700 | 21,900 | 30,200 | 12,400 | 11,700 | 17,100 | 1.06 | 46.6 | 4.63 | 5 | 7.6 |
| 14 | 3.03 | 1.1 | 16,400 | 17,100 | 23,700 | 15,500 | 14,800 | 21,400 | 1.05 | 46.3 | 3.63 | 5 | 7.6 |
| 15 | 3.66 | 0.69 | 13,000 | 13,400 | 18,600 | 19,400 | 18,800 | 27,000 | 1.03 | 46 | 2.86 | 5 | 7.6 |
| 16 | 4.61 | 0.431 | 10,300 | 10,500 | 14,700 | 24,500 | 23,800 | 34,100 | 1.03 | 45.8 | 2.26 | 5 | 7.6 |
| 17 | 6.08 | 0.269 | 8,110 | 8,360 | 11,700 | 31,000 | 30,100 | 43,300 | 1.03 | 45.8 | 1.79 | 5 | 7.6 |
| 18 | 8.37 | 0.168 | 6,410 | 6,670 | 9,260 | 39,700 | 38,100 | 55,000 | 1.04 | 46.1 | 1.42 | 5 | 7.6 |
| 19 | 11.9 | 0.105 | 5,040 | 5,360 | 7,360 | 51,000 | 48,000 | 70,000 | 1.06 | 46.8 | 1.13 | 5 | 7.6 |
| 20 | 17.4 | 0.0656 | 3,900 | 4,320 | 5,820 | 65,800 | 59,500 | 88,700 | 1.11 | 47.9 | 0.893 | 5 | 7.6 |
| 21 | 26 | 0.041 | 3,020 | 3,490 | 4,610 | 85,100 | 73,500 | 112,000 | 1.16 | 49.2 | 0.707 | 5 | 7.6 |
| 22 | 39.3 | 0.0256 | 2,300 | 2,810 | 3,620 | 110,000 | 89,600 | 141,000 | 1.22 | 50.7 | 0.556 | 5 | 7.6 |
| 23 | 60 | 0.016 | 1,710 | 2,260 | 2,830 | 141,000 | 107,000 | 177,000 | 1.32 | 52.9 | 0.434 | 5 | 7.6 |
| 24 | 92.3 | 0.01 | 1,260 | 1,800 | 2,200 | 180,000 | 126,000 | 220,000 | 1.44 | 55.1 | 0.337 | 5 | 7.6 |

TABLE 7

Rheological Properties of Example 6

| Meas. Pts. | Time [min] | Ang. Freq. [rad/s] | G' [Pa] | G" [Pa] | G* [Pa] | est' [Pa·s] | eta" [Pa·s] | eta* [Pa·s] | tan delta [1] | delta [°] | Torque [mNm] | Strain [%] | Angle [mrad] |
|---|---|---|---|---|---|---|---|---|---|---|---|---|---|
| 1 | 0.134 | 500 | 333,000 | 194,000 | 385,000 | 387 | 665 | 770 | 0.582 | 30.2 | 58.8 | 4.98 | 7.57 |
| 2 | 0.326 | 312 | 278,000 | 175,000 | 328,000 | 561 | 889 | 1,050 | 0.631 | 32.2 | 50.3 | 4.99 | 7.59 |
| 3 | 0.523 | 195 | 228,000 | 156,000 | 276,000 | 797 | 1,170 | 1,420 | 0.682 | 34.3 | 42.3 | 4.99 | 7.59 |
| 4 | 0.702 | 122 | 185,000 | 136,000 | 230,000 | 1,120 | 1,520 | 1,880 | 0.736 | 36.4 | 35.2 | 4.99 | 7.59 |
| 5 | 0.777 | 76.2 | 147,000 | 118,000 | 189,000 | 1,550 | 1,930 | 2,480 | 0.802 | 38.7 | 29 | 5 | 7.6 |
| 6 | 0.944 | 47.6 | 117,000 | 99,200 | 153,000 | 2,080 | 2,450 | 3,220 | 0.849 | 40.3 | 23.5 | 5 | 7.61 |
| 7 | 1.13 | 29.7 | 91,400 | 82,500 | 123,000 | 2,780 | 3,070 | 4,140 | 0.903 | 42.1 | 18.9 | 5 | 7.6 |
| 8 | 1.29 | 18.6 | 70,900 | 67,600 | 98,000 | 3,640 | 3,820 | 5,280 | 0.953 | 43.6 | 15 | 5 | 7.6 |
| 9 | 1.44 | 11.6 | 54,800 | 54,600 | 77,300 | 4,700 | 4,730 | 6,670 | 0.995 | 44.9 | 11.9 | 5 | 7.6 |
| 10 | 1.62 | 7.25 | 42,300 | 43,400 | 60,600 | 5,990 | 5,830 | 8,360 | 1.03 | 45.8 | 9.3 | 5 | 7.6 |
| 11 | 1.86 | 4.53 | 32,700 | 34,300 | 47,400 | 7,570 | 7,220 | 10,500 | 1.05 | 46.3 | 7.26 | 5 | 7.6 |
| 12 | 2.15 | 2.83 | 25,400 | 26,900 | 37,000 | 9,500 | 8,980 | 13,100 | 1.06 | 46.6 | 5.67 | 5 | 7.6 |
| 13 | 2.53 | 1.77 | 19,900 | 21,000 | 28,900 | 11,900 | 11,200 | 16,400 | 1.06 | 46.6 | 4.44 | 5 | 7.6 |
| 14 | 3.02 | 1.1 | 15,600 | 16,400 | 22,600 | 14,900 | 14,100 | 20,500 | 1.05 | 46.5 | 3.47 | 5 | 7.6 |
| 15 | 3.65 | 0.69 | 12,300 | 12,900 | 17,800 | 18,700 | 17,800 | 25,800 | 1.05 | 46.3 | 2.73 | 5 | 7.6 |
| 16 | 4.6 | 0.431 | 9,690 | 10,100 | 14,000 | 23,500 | 22,500 | 32,500 | 1.04 | 46.2 | 2.15 | 5 | 7.6 |
| 17 | 6.07 | 0.269 | 7,630 | 7,990 | 11,000 | 29,700 | 28,300 | 41,000 | 1.05 | 46.3 | 1.69 | 5 | 7.6 |
| 18 | 8.35 | 0.168 | 6,000 | 6,340 | 8,730 | 37,700 | 35,700 | 51,900 | 1.06 | 46.6 | 1.34 | 5 | 7.6 |
| 19 | 11.9 | 0.105 | 4,720 | 5,060 | 6,920 | 48,100 | 44,900 | 65,900 | 1.07 | 47 | 1.06 | 5 | 7.6 |
| 20 | 17.4 | 0.0656 | 3,680 | 4,060 | 5,480 | 61,800 | 56,000 | 83,400 | 1.1 | 47.8 | 0.84 | 5 | 7.6 |
| 21 | 26 | 0.041 | 2,870 | 3,250 | 4,340 | 79,300 | 69,900 | 106,000 | 1.13 | 48.6 | 0.665 | 5 | 7.6 |
| 22 | 39.3 | 0.0256 | 2,190 | 2,620 | 3,420 | 102,000 | 85,600 | 133,000 | 1.19 | 50.1 | 0.524 | 5 | 7.6 |
| 23 | 60 | 0.016 | 1,670 | 2,110 | 2,690 | 132,000 | 104,000 | 168,000 | 1.26 | 51.6 | 0.412 | 5 | 7.6 |
| 24 | 92.3 | 0.01 | 1,260 | 1,690 | 2,110 | 169,000 | 126,000 | 211,000 | 1.35 | 53.4 | 0.323 | 5 | 7.6 |

TABLE 8

| Example | Ex. 1 | Ex. 2 | Ex. 3 | Ex. 4 | PP2 |
|---|---|---|---|---|---|
| PE1 (wt. %) | 100 | 95 | 90 | 80 | 0 |
| PP2 (wt. %) | 0 | 5 | 10 | 20 | 100 |
| Melt Strength (cN) | 8.5 | 8.6 | 9.0 | 14.3 | 52.0 |
| Slope (cN/wt % PP2) | n/a | 0.02 | 0.05 | 0.29 | 0.435 |
| SCR$_{10}$ | — | — | — | 5.5 | 1.5 |

The compositions, melt strength, slope and SCR data of Examples 1-4, and 100% PP2 are set out in Table 8.

Although the present invention has been described in considerable detail with reference to certain aspects and embodiments thereof, other aspects and embodiments are possible. Therefore, the spirit and scope of the appended claims should not be limited to the description of the embodiments contained herein.

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated herein by reference for all jurisdictions in which such incorporation is permitted.

What is claimed is:

1. A polymer composition comprising:
   (a) an ethylene-based polymer having a density of 0.910 to 0.960 g/cm$^3$ and a CDBI of at least 70;
   (b) a propylene-based polymer having a MWD greater than 5.0 and a melt strength of 20.0 cN to 200.0 cN; and
   (c) optionally, a propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g and wherein the propylene-based polymer is present in an amount of from 10.0 to 50.0 wt. % based on the total weight of the composition.

2. The composition of claim 1, wherein the ethylene-based polymer has 0.05 to 1.0 long-chain branches per 1000 carbon atoms.

3. The composition of claim 1, wherein the ethylene-based polymer comprises about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a complex modulus, $G_{60}^*$, <2.50×10$^3$ Pa.

4. The composition of claim 1, wherein the ethylene-based polymer of claim 1 has a complex modulus, $G_{50}^*$, <5.00×10$^3$ Pa.

5. The composition of claim 1, wherein the ethylene-based polymer has a complex modulus, $G_{60}^*$, <2.50×10$^3$ Pa.

6. The composition of claim 1, wherein the ethylene-based polymer comprises about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a CDBI≥70.0%; a melt index, $I_{2.16}$, of about 0.05 to about 0.50 g/10 min.; a density of from about 0.930 to about 0.950 g/cm$^3$; and a MWD of about 2.5 to about 5.5, and a complex modulus, $G_{60}^*$, <2.50×10$^3$ Pa.

7. The composition of claim 1, wherein the ethylene-based polymer comprises about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a local maximum loss angle at a complex modulus, $G^*$, of 2.50×10$^4$ to 1.00×10$^5$ Pa and a local minimum loss angle at a complex modulus, $G^*$, of 1.00×10$^4$ to 3.00×10$^4$ Pa.

8. The composition of claim 1, wherein the propylene-based polymer has a branching index (g') of at least 0.95.

9. The composition of claim 1, wherein the propylene-based polymer has a viscosity ratio of from about 35 to about 80 determined from the complex viscosity ratio at 0.01 to 100 rad/s angular frequency at a fixed strain of 10% at 190° C.

10. The composition of claim 1, wherein the propylene-based polymer has a heat distortion temperature of greater than or equal to about 100° C., determined according to ASTM D648 using a load of 0.45 MPa (66 psi).

11. The composition of claim 1, wherein the propylene-based polymer is produced by contacting propylene monomers at propylene polymerization conditions with a catalyst system comprising a Ziegler-Natta catalyst comprising a non-aromatic internal electron donor, and first and second external electron donors comprising different organosilicon compounds.

12. The composition of claim 1, wherein the propylene-based elastomer is present in an amount of from 0.1 to about 25.0 wt. % of one or more propylene-based elastomers.

13. The composition of claim 1, wherein about 8.0 to about 22.5 wt. % of the polymer units in the propylene-based elastomer are ethylene-derived units and the polypropylene-based elastomer has an MFR of about 2.0 to about 30.0 g/10 min.

14. The composition of claim 1, wherein the propylene-based elastomer has a weight average molecular weight ($M_w$) of about 5.0×10$^3$ to about 5.0×10$^6$ g/mol.

15. The composition of claim 1 having a melt strength of 5.0 to 30.0 cN, determined using an extensional rheometer at 190° C.

16. The composition of claim 1, having one or more of the following properties:
(i) $G_{50}^*$ of about 2.50×10$^3$ Pa to about 1.0×10$^4$ Pa;
(ii) a $G_{40}^*$, of 1.00×10$^5$ Pa to about 2.0×10$^5$ Pa; and/or
(iii) a $G^*$ value of 5.00×10$^3$ Pa at a loss angle, δ, of 40.0 to 55.0.

17. The composition of claim 1 having one or more of the following:
(i) a local maximum loss angle at a $G^*$ value of 2.50×10$^4$ to 1.00×10$^5$ Pa;
(ii) a local minimum loss angle at a $G^*$ value of 1.00×10$^4$ to 3.00×10$^4$ Pa.

18. A composition formed from at least the following:
(a) 65.0 to 90.0 wt. % of an ethylene-based polymer comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a CDBI≥70.0; a melt index, $I_{2.16}$, of about 0.05 to about 0.50 g/10 min.; a density of from about 0.930 to about 0.950 g/cm$^3$; and a MWD of about 2.5 to about 5.5, and a complex modulus, $G_{60}^*$, <2.50×10$^3$ Pa;
(b) 10.0 to 35.0 wt. % of a propylene-based polymer having a MWD greater than 5.0; and
(c) 0 to about 25.0 wt. % of one or more propylene-based elastomers comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g.

19. A composition formed from at least the following:
(a) 65.0 to 90.0 wt. % of an ethylene-based polymer comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a local maximum loss angle at a complex modulus, $G^*$, of 2.50×10$^4$ to 1.00×10$^6$ Pa and a local minimum loss angle at a complex modulus, of 1.00×10$^4$ to 3.00×10$^4$ Pa;
(b) 10.0 to 35.0 wt. % of a propylene-based polymer having a MWD greater than 5.0 and a melt strength of 20.0 cN to 200.0 cN; and
(c) 0 to about 25.0 wt. % of one or more propylene-based elastomers comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g.

20. The composition of claim 19, wherein the propylene-based polymer has a heat distortion temperature of greater than or equal to about 100° C., determined according to ASTM D648 using a load of 0.45 MPa (66 psi).

21. A method of making a polymer composition comprising: combining at least the following:
(a) an ethylene-based polymer having a density of 0.910 to 0.960 g/cm$^3$ and a CDBI of at least 70;
(b) a propylene-based polymer having a MWD greater than 5.0 and a melt strength of 20.0 cN to 200.0 cN; and
(c) optionally, a propylene-based elastomer comprising at least about 60.0 wt. % propylene-derived units and about 5.0 to about 25.0 wt. % ethylene-derived units, based on total weight of the propylene-based elastomer, wherein the propylene-based elastomer has a heat of fusion of less than about 80.0 J/g and wherein the propylene-based polymer is present in an amount of from 10.0 to 50.0 wt. % based on the total weight of the composition.

* * * * *